United States Patent
Olsson et al.

(12) 
(10) Patent No.: US 9,465,129 B1
(45) Date of Patent: Oct. 11, 2016

(54) IMAGE-BASED MAPPING LOCATING SYSTEM

(75) Inventors: Mark S. Olsson, La Jolla, CA (US);
Paul G. Stuart, La Mesa, CA (US);
Michael J. Martin, San Diego, CA (US); Paul Wisecaver, San Diego, CA (US); Ray Merewether, La Jolla, CA (US)

(73) Assignee: SEE SCAN, INC., San Diego, CA (US)

( * ) Notice: Subject to any disclaimer, the term of this patent is extended or adjusted under 35 U.S.C. 154(b) by 1197 days.

(21) Appl. No.: 12/947,503

(22) Filed: Nov. 16, 2010

Related U.S. Application Data

(60) Provisional application No. 61/262,852, filed on Nov. 19, 2009.

(51) Int. Cl.
*G06F 19/00* (2011.01)
*G01V 3/15* (2006.01)
*G01V 3/38* (2006.01)

(52) U.S. Cl.
CPC .. *G01V 3/15* (2013.01); *G01V 3/38* (2013.01)

(58) Field of Classification Search
CPC .................................. G01V 3/15; G01V 3/38
See application file for complete search history.

(56) References Cited

U.S. PATENT DOCUMENTS

| | | | |
|---|---|---|---|
| 5,438,265 A * | 8/1995 | Eslambolchi et al. ........ | 324/326 |
| 6,349,653 B1 * | 2/2002 | Siedlarczyk .................. | 104/279 |
| 6,480,270 B1 * | 11/2002 | Studnicka et al. ......... | 356/141.1 |
| 7,030,759 B2 * | 4/2006 | Nelson .......................... | 340/551 |
| 7,113,124 B2 * | 9/2006 | Waite .............................. | 342/22 |
| 7,136,059 B2 * | 11/2006 | Kraus et al. .................. | 345/419 |
| 7,136,765 B2 * | 11/2006 | Maier et al. .................... | 702/65 |
| 7,443,154 B1 * | 10/2008 | Merewether et al. ......... | 324/67 |
| 7,656,311 B2 * | 2/2010 | Holmes et al. ............... | 340/988 |
| 2007/0210929 A1 * | 9/2007 | Sabata et al. .............. | 340/686.5 |
| 2007/0239350 A1 * | 10/2007 | Zumsteg et al. ............. | 701/207 |
| 2011/0022433 A1 * | 1/2011 | Nielsen et al. ................... | 705/7 |
| 2011/0191058 A1 * | 8/2011 | Nielsen et al. ............... | 702/130 |

* cited by examiner

*Primary Examiner* — Zhubing Ren
(74) *Attorney, Agent, or Firm* — Steven C. Tietsworth, Esq.

(57) ABSTRACT

A locator system for locating buried utilities such as conduits, cables, pipes or wires incorporates image-capturing and position and orientation measuring devices such as magnetic compass, accelerometers, gyros, GPS, and DGPS. The system may include other sensors such as gas concentration sensors. The system associates images captured during the locate process with buried utility position data and the other sensor data. These data and images may be further associated with terrain images from satellites or aerial photography to provide a highly precision map and database of buried utility locations and visual images of the burial site. Information so obtained may be transferred to a hand-held personal communication device (such as a smart phone) capable of displaying an augmented or virtual reality display showing the location of buried utilities in combination with photo-images and/or terrain maps.

30 Claims, 24 Drawing Sheets

IMAGE-BASED MAPPING LOCATING SYSTEM

CROSS-REFERENCE TO RELATED APPLICATION AND PATENTS

This application claims priority based on U.S. Provisional Patent Application No. 61/262,852, filed on 19 Nov. 2009, entitled Image-Based Mapping Locating System. This application is related to U.S. patent application Ser. No. 12/399,859 filed Mar. 6, 2009, by Mark S. Olsson et al, entitled "Pipe Inspection System with Selective Image Capture", the entire disclosure of which is hereby incorporated by reference. It is also related to U.S. Pat. No. 7,443,154 filed Jan. 8, 2008, by Ray Merewether et al, entitled "Multi-sensor Mapping Omnidirectional Sonde and Line Locator", the entire disclosure of which is hereby incorporated by reference.

BACKGROUND

Field of the Invention

This invention relates generally to electronic systems and imaging methods for locating and mapping buried or otherwise inaccessible pipes and other conduits, cables, conductors and inserted transmitters, and more specifically to Sonde and line locators for detecting electromagnetic signals. With the evolution of more complex infrastructures requiring enhancement, replacement, and expansion in all areas of human occupation, and in particular high-density areas such as cities and suburbs, the ability to accurately map the location of buried conduits, wires and pipelines of various sizes and kinds becomes more pressing, as does the need to document actual as-built underground installations before they are covered so that they can be precisely located at a later date.

SUMMARY OF THE INVENTION

In accordance with the present invention, a locating system includes at least one electromagnetic sensing antenna, a display, a processor, and a. data storage device operatively connected to the processor. Programming at least partially stored in the data storage device enables the processor to determine the location of a buried utility based on signals generated by the sensing antenna and to generate buried utility positional data that can be viewed on the display. An image sensor is operatively connected to the processor for generating signals representing images captured by the image sensor during a locating process to substantially include an area being mapped.

DETAILED DESCRIPTION

Figure 1:
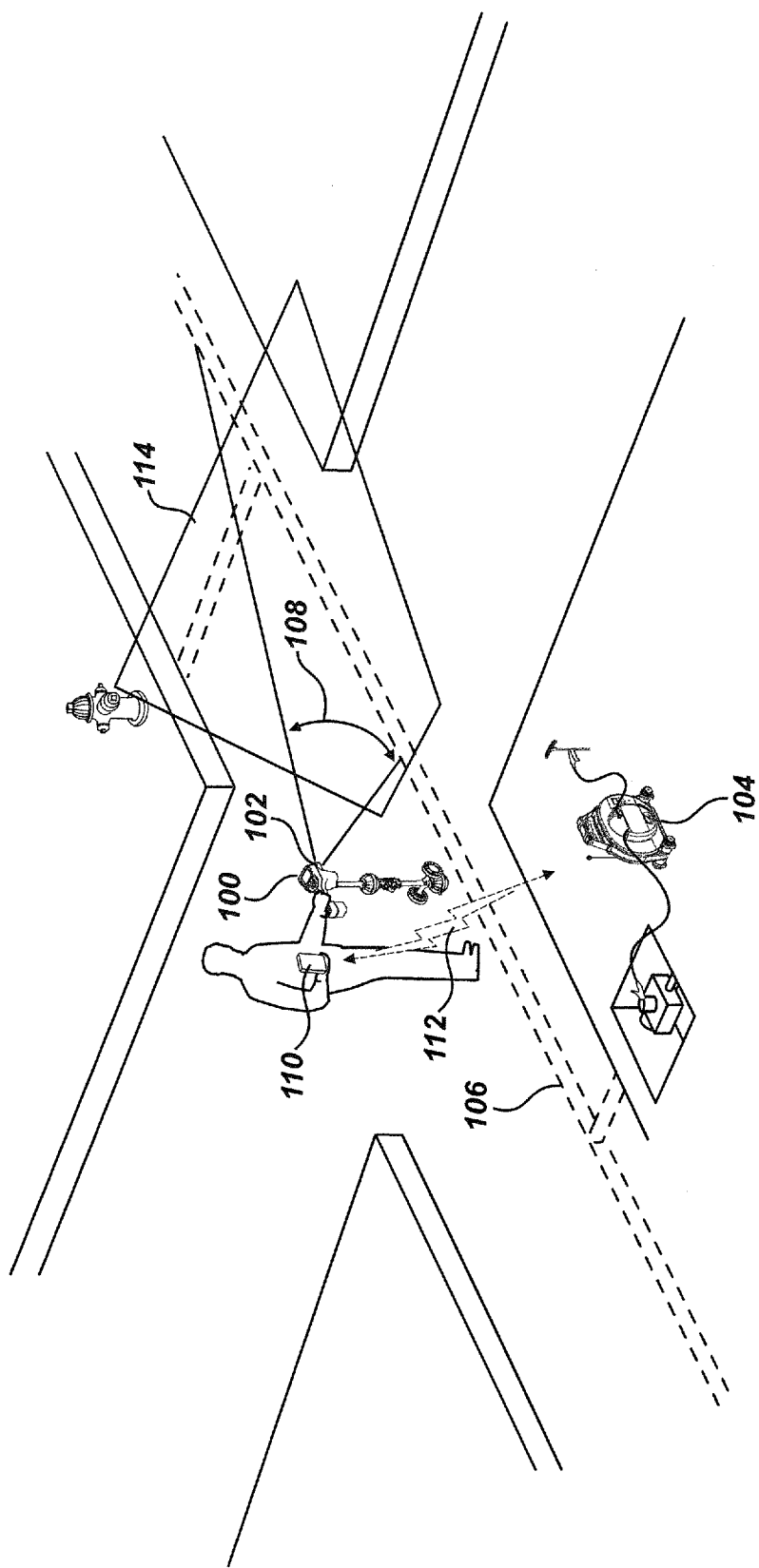
FIG. 1 illustrates an imaging enabled locator in accordance with an embodiment of the present invention being used at an intersection to locate and map buried utilities.

The present invention provides a man-portable locating system including an imaging device and position and orientation sensors capable of integrating visual images from a locate site with existing site images from other sources and correlating images into a composite portrayal of site measurement and relative orientation. In the illustrated embodiments of the present invention, multiple images and associated imager position and orientation are captured and stored where said images are captured during a locating process. At least some images are captured in a non-vertical, non-bird's eye view and then are subsequently projected into a bird's eye view orientation. Two or more images may be placed into alignment with one another to form a larger mosaic image. In use, the "pose" (position and orientation) of the buried utility or Sonde position location, orientation and depth information is stored with position and orientation information that correlates to said captured images. The buried utility position and depths are displayed in composite with said images so that the true relative position of the buried utilities can be seen in relation to objects in said images. Such positions may be two-dimensional or three-dimensional and when combined with locator measurements may include subterranean profiles and depths of objects of interest. Sensors used in establishing position and orientation may include GPS receivers, inertial sensors, accelerometers, compass, gyroscopic sensors, acoustic sensors, optical sensors, laser range-finding devices, structured lighting range finding camera, optical character recognition (OCR) sensors and processing, bar-code readers, and other sensors. Further, stereoscopic image sensors and processing may be employed to build a three-dimensional environmental model of a locate site to improve utility position information relative to physical objects and structures in the environment.

The composite images and associated utility position information are placed into and aligned to fit in a positionally indexed manner with a satellite or aerial image, either bird's eye view or oblique enabling a composite view aligned with the geophysical appearance of the area where the underground locating activity occurred. The satellite or aerial images are available on line and acquired on line by the system, or they may be otherwise acquired. Buried utility coordinates are associated with local images and with available larger-area images and such images and sensor measurements are processed and stored in a suitable database architecture which can accept various kinds of supplementary data and produce many kinds of output The present invention integrates the technology of underground locating with visual mapping in innovative ways. The present invention emphasizes the integration of locate and orientation information with correlated and indexed site images captured during the locate from a compound locator, sensor and image capture system, and the further integration of these with wider-area images of the site available from other sources, such as those used in modern mapping services on line (e.g., Google Earth, Google Maps, Bing Maps, Pictometry®, MSN Encarta, etc.) or by site-specific fly-overs. The auxiliary data from sensors may also take the form of a relational database to associate the data with related images via a lookup table indicating the logical and physical location of the image files. The image capturing device may capture still images or video, and the use of the term "images" throughout the following description refers to either still images or frames extracted from video.

In FIG. 1 illustrates the general deployment of an imaging enabled locator 100 having an on-board integrated image capturing camera 102. A human operator has previously connected a wireless enabled locating transmitter 104 to an underground water line 106. By way of example, the locator 100 may be of the various types disclosed in U.S. Pat. Nos. 7,009,399; 7,136,765; 7,332,901; 7,336,078; 7,443,154; 7,498,797; 7,498,816; 7,518,374; 7,619,516; 7,733,077; 7,741,848; 7,755,360; and 7,830,149, all assigned to SeekTech, Inc., the entire disclosures of all of which are hereby incorporated by reference. The locator 100 may also be of the type disclosed in published U.S. Patent Application Pub. No. US 2010/0272885 A1 published on Oct. 28, 2010 and based on U.S. patent application Ser. No. 12/827,993 filed by Mark S. Olsson et al. on Jun. 30, 2010 and entitled "Marking Paint Applicator for Portable Locator", also assigned to SeekTech, Inc., the entire disclosure of which is hereby incorporated by reference. The transmitter 104 may be of the type disclosed in pending U.S. patent application Ser. No. 11/961,858 filed by Ray Merewether et al. on Dec. 20, 2007 and entitled "High-Q Self-Tuning Locating Transmitter", also assigned to SeekTech, Inc., the entire disclosure of which is hereby incorporated by reference. Alternatively, the transmitter 104 may include self-tuning resonator circuitry of the type disclosed in U.S. Pat. No. 7,276,910 also assigned to SeekTech, Inc., the entire disclosure of which is hereby incorporated by reference. The integrated image capturing camera 102 has an angled field of view tilted downwards toward the ground ahead of the imaging enabled locator 100 which images some distance ahead, indicated by a vertical angle of view 108. Suitable examples of the image capturing camera 102 include the OV9810 color image sensor and the OV7962 color CMOS Digital Image Sensor, both commercially available from OmniVision, 4275 Burton Drive, Santa Clara, Calif. 95054, USA. Optionally, the operator can use a personal communication device 110 (such as a modern smart-phone, Blackberry, Droid, iPad, or the like) running custom, application specific software, from which the operator is able to issue wireless control signals 112 to the wireless enabled locating transmitter 104. As will be understood by one versed in the art, the integrated image capturing camera 102 will capture a smaller physical unit of area per pixel in its near field, closer to the imaging enabled locator 100, than it will in its further field ahead of the imaging enabled locator 100. This effect is represented by a trapezoidal image area 114 covering the area of image capture at a single moment. Further in FIG. 1 the operator optionally controls the wireless enabled locating transmitter 104 with a wireless control link integrated into the imaging enabled locator 100. The imaging enabled locator 100 may also automatically control the wireless enabled locating transmitter 104 to optimize signal quality and accuracy.

Figure 2:
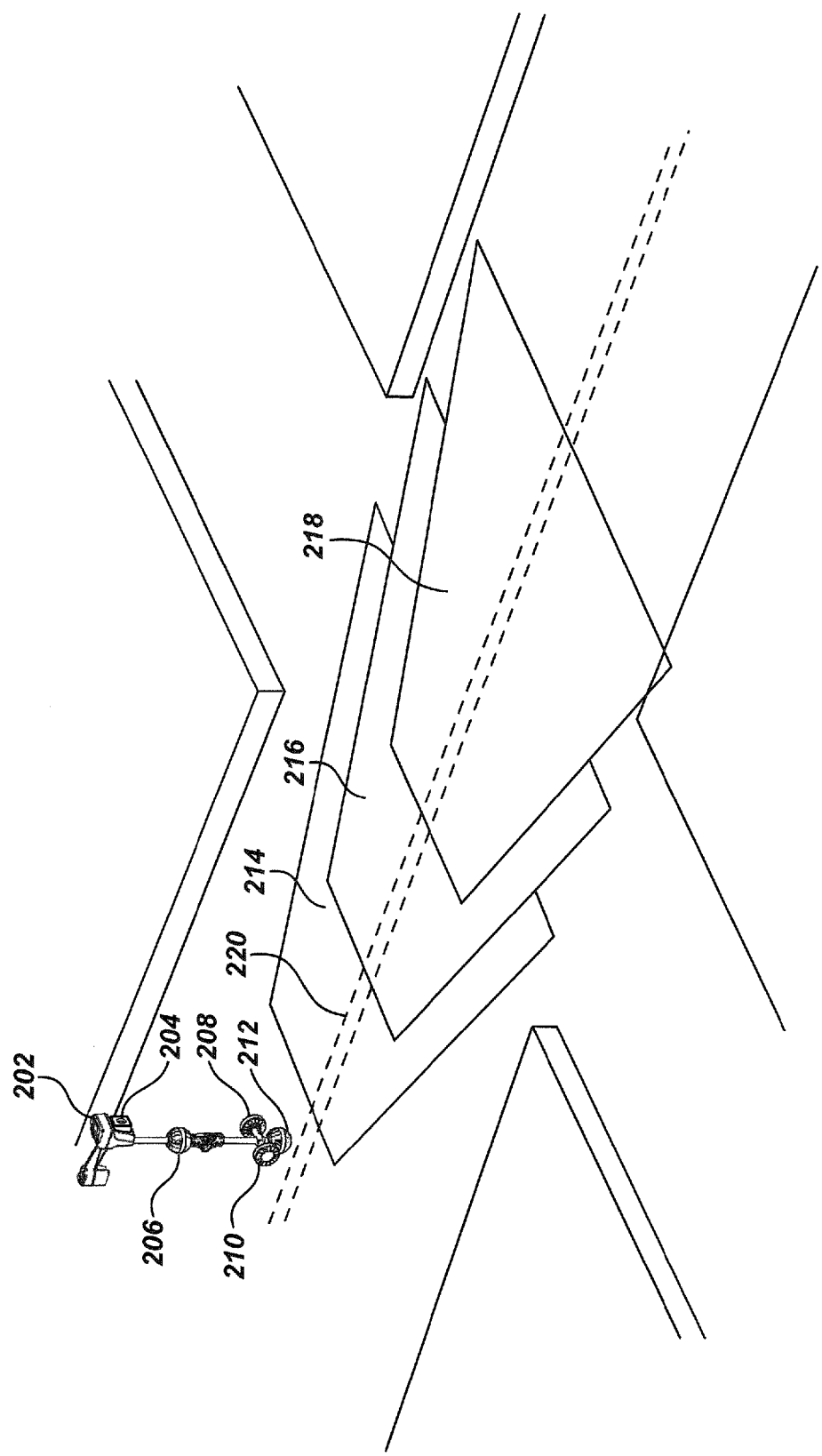
FIG. 2 diagrammatically illustrates a similar locator capturing typical ground images in the course of locating a buried utility line.

FIG. 2 illustrates an imaging locator 202 and its line of progress during the locating process. The imaging locator 202 contains a downwardly tilted camera 204 and in this configuration uses an upper omnidirectional antenna array 206, a left gradient coil antenna 208, a right gradient coil antenna 210, and a lower omnidirectional antenna array 212 for sensing the fields generated along a buried utility 220. Image data captured by the downwardly tilted camera 204 is represented by a series of trapezoidal formed image areas: a near image area 214, a mid-range image area 216, and a far image area 218, each representing examples of the image data space captured in a time series while locating is in progress along a buried utility 220. The non-rectangular shape of the image areas 214, 216, 218 is indicative of the smaller physical unit of area per pixel closer to the downwardly tilted camera 204 as previously described.

Figure 3A:
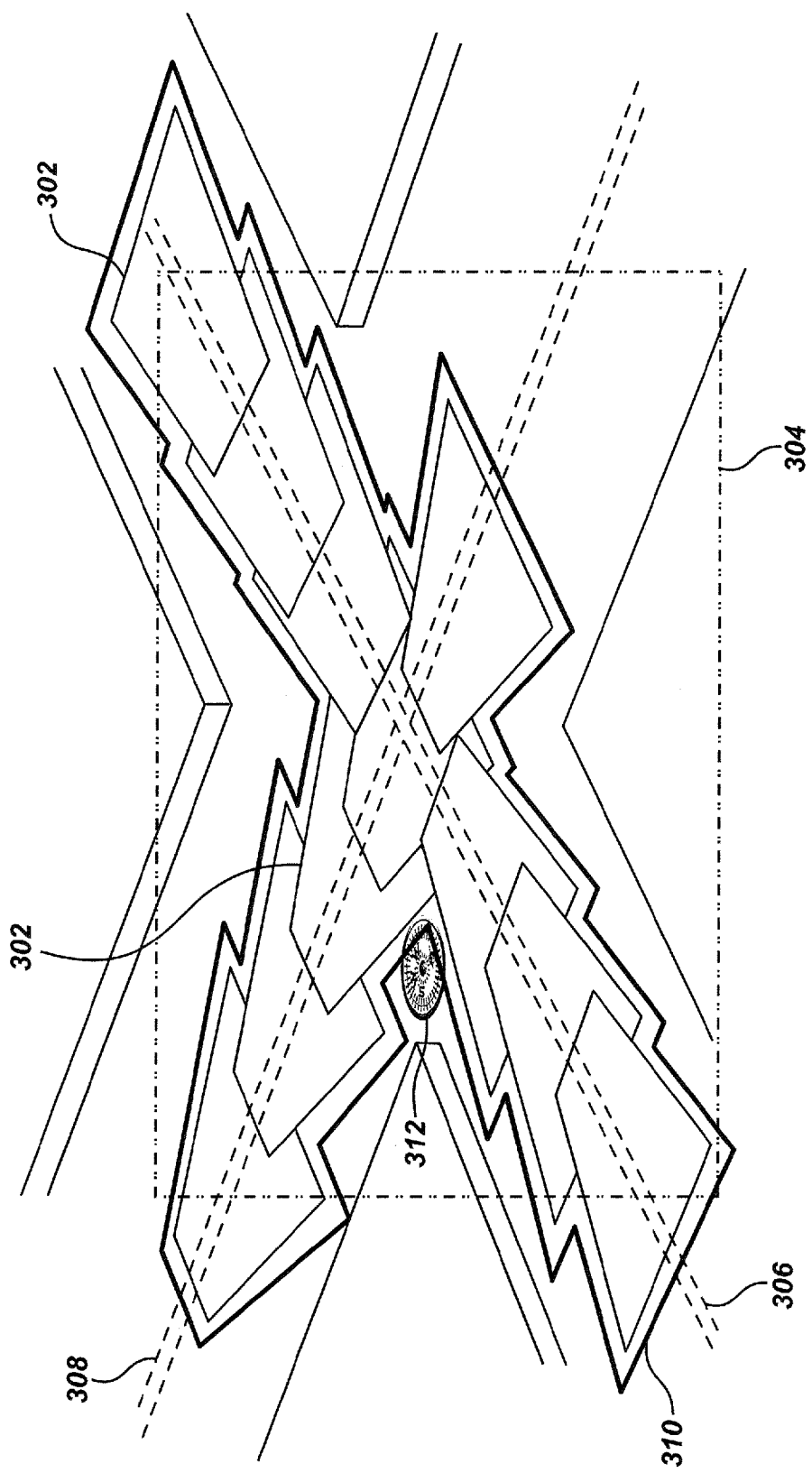
FIG. 3A is another diagrammatic illustration of the image-capturing process as it advances during the locate process.
Figure 3B:
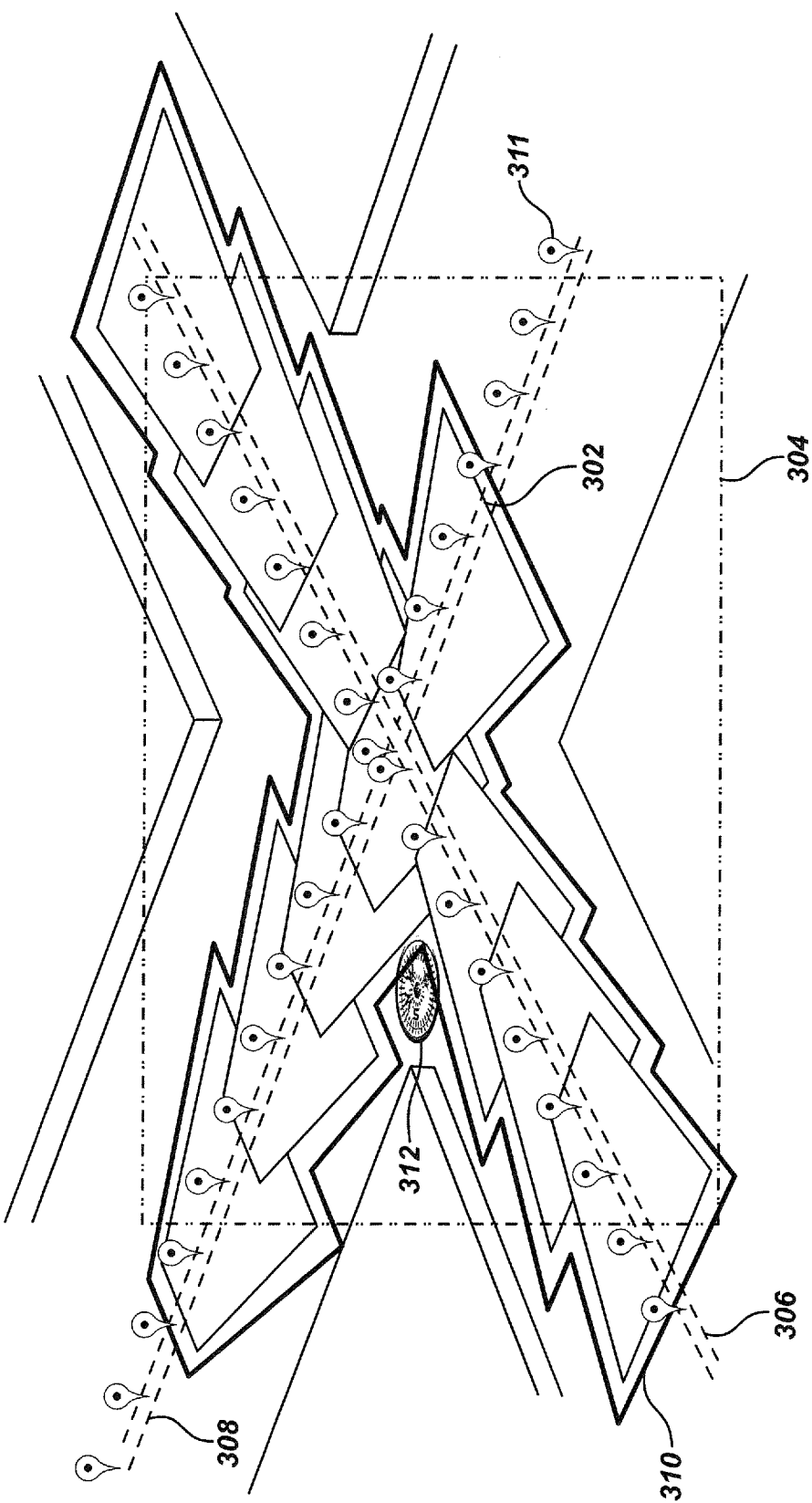
FIG. 3B diagrammatically illustrates the capture of locator data in the same process.

In the course of locating, it is expected that the operator will take a non-linear path in tracing the signal as he or she seeks to clarify signal distortion caused by joints, tees, or nearby ferrous objects such as parked cars or manhole covers. FIG. 3A illustrates the process of the locate as the operator follows a path, with a series of trapezoidal polygons 302 representing the camera's image captures at intervals, within a region of interest 304, along the main axis of a pipe 306, and a branch pipe 308. Using a combination of primary image processing from the on-board camera and positional information from GPS sensors, inertial sensors and other sensors, the plurality of trapezoidal polygons 302 representing, image data, may be processed on site or processed later at a remote site into a large composite irregular polygon image 310. In addition to the image areas, data representing locator-detected positions and depths of buried utilities is also stored. In FIG. 3B a series of location flags 311 represents a sampling of the detection data captured by the locator indicating the path of the pipe 306 and a branch pipe 308. Increased resolution may be achieved in areas of overlaps through the process of variable-pixel linear reconstruction, known in the art as drizzling (See Ratlege, D., 2005, "Digital Astrography: The State of the Art", Springer, ISBN 1852337346). In operation, the location of relatively fixed observable artifacts such as a manhole cover 312 may also be particularly identified with GPS coordinates and/or imaging during a locate to support correlating the locator frame of reference with imagery and with the geographical grid as feasible.

Figure 4:
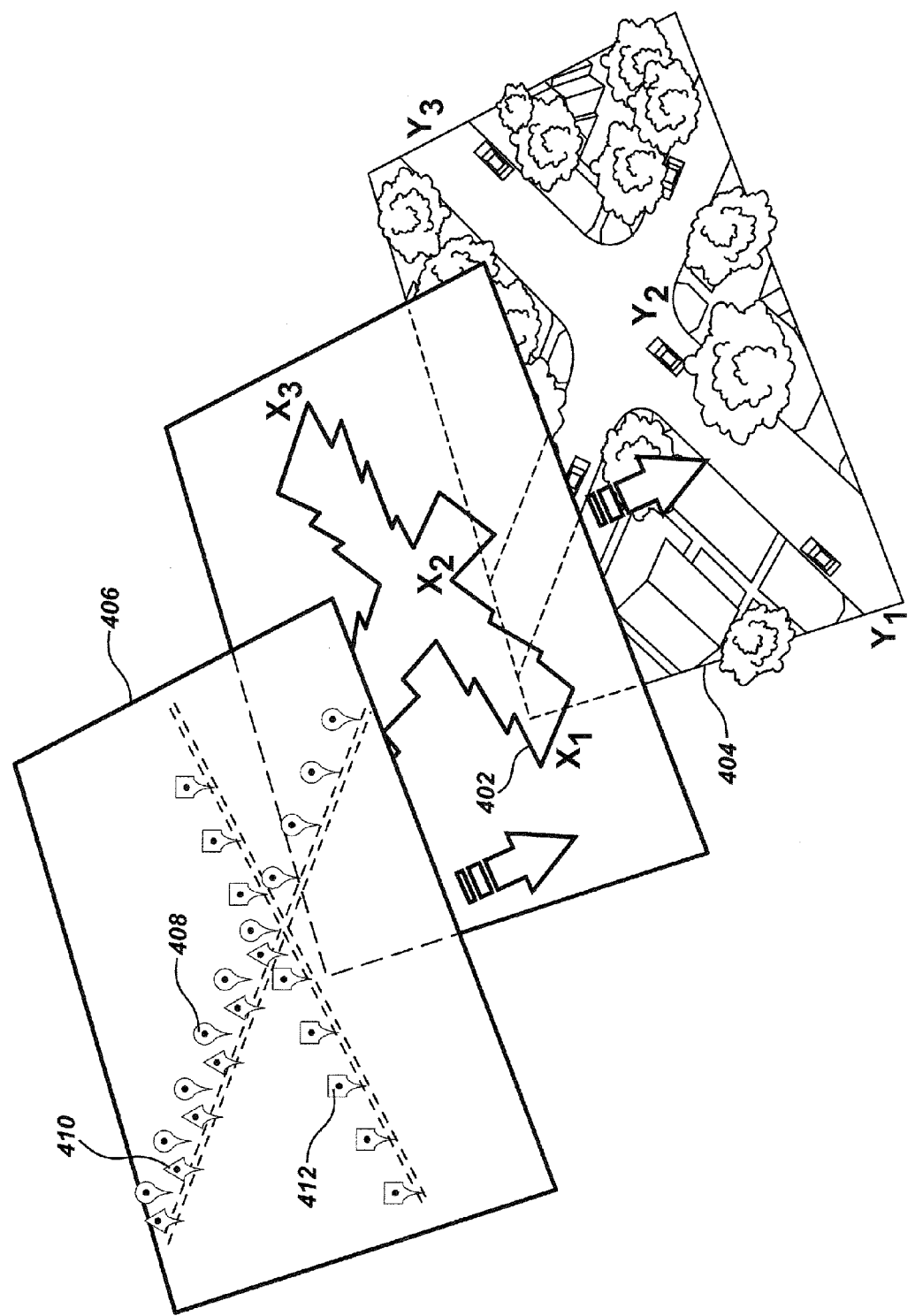
FIG. 4 diagrammatically illustrates the high-level integration process of the composite image space with an acquired geophysical image of the region of interest.

FIG. 4 illustrates the composite image space represented as three layers including a layer including a composite irregular polygon image 402 from such a locate process, being mapped relative to a geo-referenced terrain image 404, such as an image acquired from a satellite library on line, or from a downloaded series of fly-over images taken for a particular survey. In FIG. 4, representative points $Y_1, Y_2, Y_3$ in the geo-referenced terrain image 404 are identified as correlating and corresponding to specific points in the composite irregular polygon image 402, $X_1, X_2, X_3$, for example. By mapping points using multiple algorithms of image blending, image edge recognition, GPS mapping and correction, through multiple iterations, the internal and edge points of the composite irregular polygon image 402 are aligned by least squares or other process to the layer consisting of the geo-referenced terrain image 404. Such data-point mapping would include both the captured image data from the locator's camera (204 in FIG. 2) and the processed information from the locator capturing and refining detection data from the buried pipes (as represented by 306 and 308 in FIGS. 3A and 3B). A third utility data layer 406 represents the time-tagged locator detection data in which a set of water line data points 408, a set of gas line data points 410, and a set of phone cable data points 412 derived from locate tasks are mapped relative to the composite irregular polygon image 402 and the geo-referenced terrain image 404. As an example, FIG. 4 illustrates branch pipe 308 (FIG. 3A) as a single straight pipe. The positional relationship between the locate data and the images acquired by the on-board camera is known and fixed and they are both correlated to the underlying map to which the geo-referenced terrain image 404 corresponds. Locator data may be geo-referenced when GPS sensor data is present. The production of composite images incorporating locate information may occur without GPS data based on visual correlations.

Figure 5:
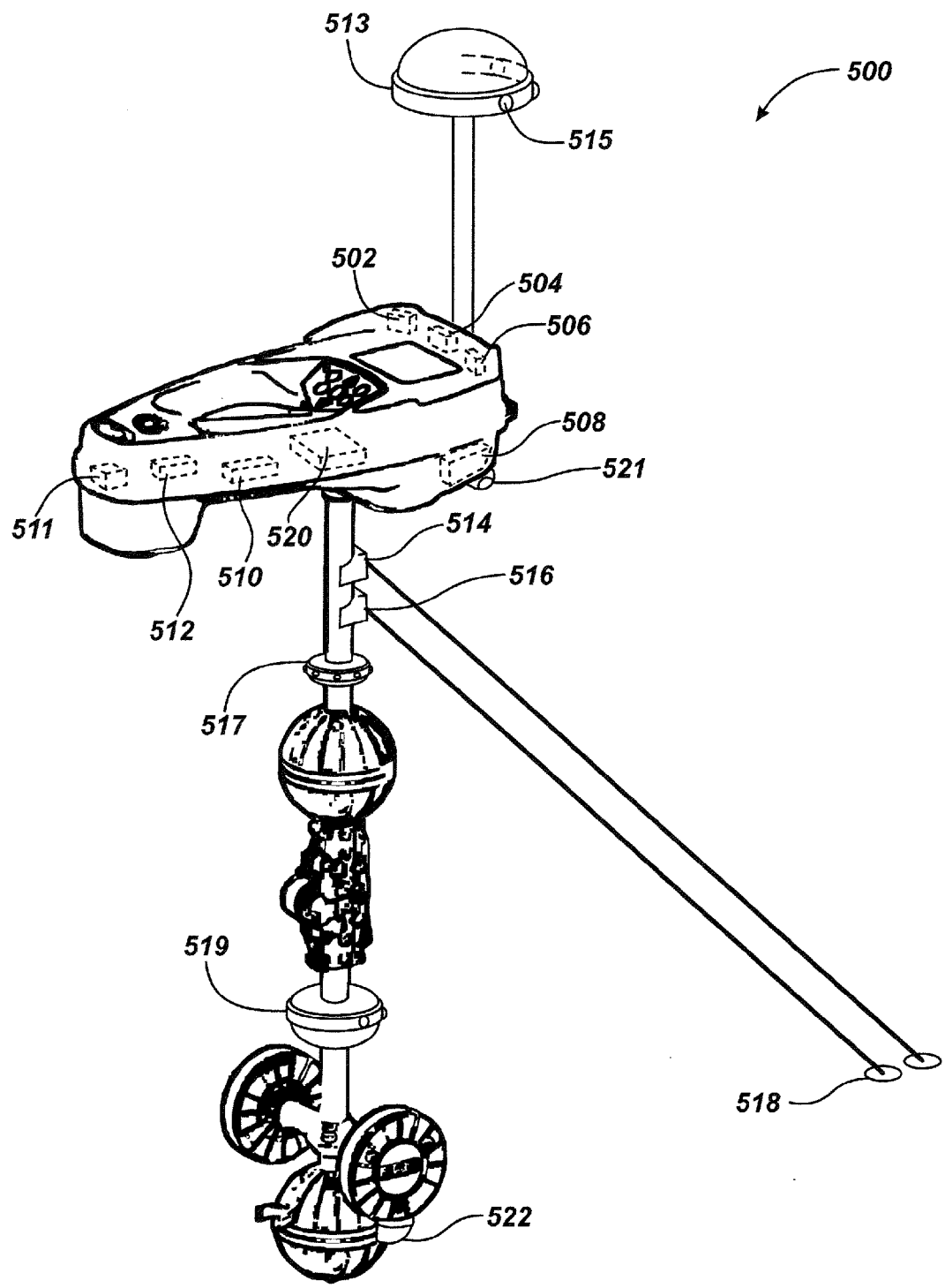
FIG. 5 is an enlarged isometric view of an embodiment of the locator of the present invention in which the locator carries multiple cameras and laser-markers.

FIG. 5 illustrates details of an embodiment of a sensor enabled locator 500. The sensor enabled locator 500 is equipped with a left camera 502, a center camera 504, and a right camera 506 whose image areas may preferably overlap. Preferably, these cameras have very wide angle-of-view lenses. The sensor enabled locator 500 further includes a GPS unit 508, an inertial sensor 510, a gyroscopic sensor 511, and a magnetic earth compass 512. An optional GPS antenna pod 513 may be mounted on a mast extending above the sensor enabled locator 500, and such a pod may also include optional additional mounted cameras 515 which are similarly used as the lower camera group. Parallel laser beams consisting of an upper laser marker 514 and a lower laser marker 516 a known offset distance apart are optionally mounted on the sensor enabled locator 500 in such an orientation as to produce two laser dots 518 on the ground in front of the sensor enabled locator 500. Additional lasers fixed or scanning, some with beam forming optics may also be employed. Other types of illumination may be used such as a micro image projector. In this embodiment the beams of the two lasers are parallel. Alternative mountings placing the beams at known precise angles may also be used. Any available structured light patterns may also be employed to project measurable patterns onto the ground surface.

In use, the distance between these two laser dots 518 in a captured image, in combination with the known mounting separation of the lasers and their angular relationship, is used to compute the slant range distance above to the imaging point of the sensor enabled locator 500 at the moment of an image capture. Because the apparent distance between the two points will be constantly related to the slant range distance of the upper and lower laser markers 514 and 516 to the laser dots 518 on the ground, the altitude above ground of the cameras 502, 504, 506 may be computed given the locator's orientation and the ground slope. This computation, along with the data from the magnetic earth compass 512, the inertial sensor 510, and data from the GPS unit 508 when available, is used in orienting captured images in processing their integration with terrain images (which may be themselves geo-referenced) more precisely. The structured light such as laser dots 518, where used, may be strobed off and on at defined intervals. An array of flashing LEDs 517 mounted around the mast of sensor enabled locator 500 above the upper antenna node casing may provide a 360-degree warning beacon for operator safety. Optionally a camera pod 519 may also be mounted above the lower antenna from which multiple camera units may provide additional digital images for storage with the buried utility positions in the locator's frame of reference. Structured light sources may be mounted low in the camera pod 519 to provide greater parallax relative to cameras mounted above. This provides an improved sensitivity to showing vertical relief of objects on the surface being imaged. As an example, several line laser sources may be employed to provide vertical relief information across the length of each laser line projected onto the ground as the sensor enabled locator 500 is moved across the ground within a locate region.

Data from the sensors and cameras is converted, controlled, and processed on board by a CPU/RAM board 520. The upper and lower laser markers 514 and 516 may further be powered off and on under the control of the CPU/RAM board 520 to strobe at defined intervals in synchronization with image capture, but with half the frequency of the image storage, resulting in a series of images alternating between showing the strobed laser dots and not showing them. In processing, a simple image subtraction routine performed in software can subtract the image with structured light from the image without structured light, resulting in an image retaining only the structured light information. Some image processors have an integrated dark frame processing capability that may be co-opted for this purpose.

An illumination unit 521 provides LED or other illumination for night time operation or for operator visibility. An optional LED light source 522 mounted on the lower antenna node case may also be used to maximize surface roughness contrast in image analysis.

The use of multiple sets of cameras provides the ability to match stereo pairs of images from upper and lower arrays enabling more precise location and orientation information during image processing. The same concept may be applied to left-right pairs. Such image pairs may be processed to form three dimensional point clouds which can be formed into surfaces onto which images may be projected providing greater realism and better understanding of an excavator viewing the images for the purposes of avoiding hidden buried utilities during the digging process.

In one aspect of the present invention, previously collected locate and image information related to buried utilities, marker balls, or other objects or structures may be rendered on top of a real-time image of an operator's surroundings based on geographical position and orientation. An operator uses a locator or other means to collect and upload information about a buried utility, marker ball, above ground utility box or geo-referenced metadata. The locator in the present invention enables the operator to also capture local images of applied paint and other utility markers. The operator may also paint a colored paint marker on the ground or place flags or marking objects that can be captured in the images.

At a later time, an operator may return to that location and observe previously located information displayed in a graphical, text, or audio indication. For example, when observing the site of a previous locate the previously collected data will be drawn on top of the image of the ground in the precise geographic location it was previously collected. This can be accomplished using a hand-held device with compass, GPS, accelerometer, and gyroscopic sensors to find the orientation and location of the hand-held device, such as a smart-phone or the like. Optional on-board lasers with red, green and blue frequencies may be used to "paint" indicators on the ground based on the calculated locations of infrastructure, for example. Additionally, previously captured fiducial information (that is, information used as a fixed standard of reference for comparison or measurement) may be used to increase the accuracy of the rendering.

Figure 6:
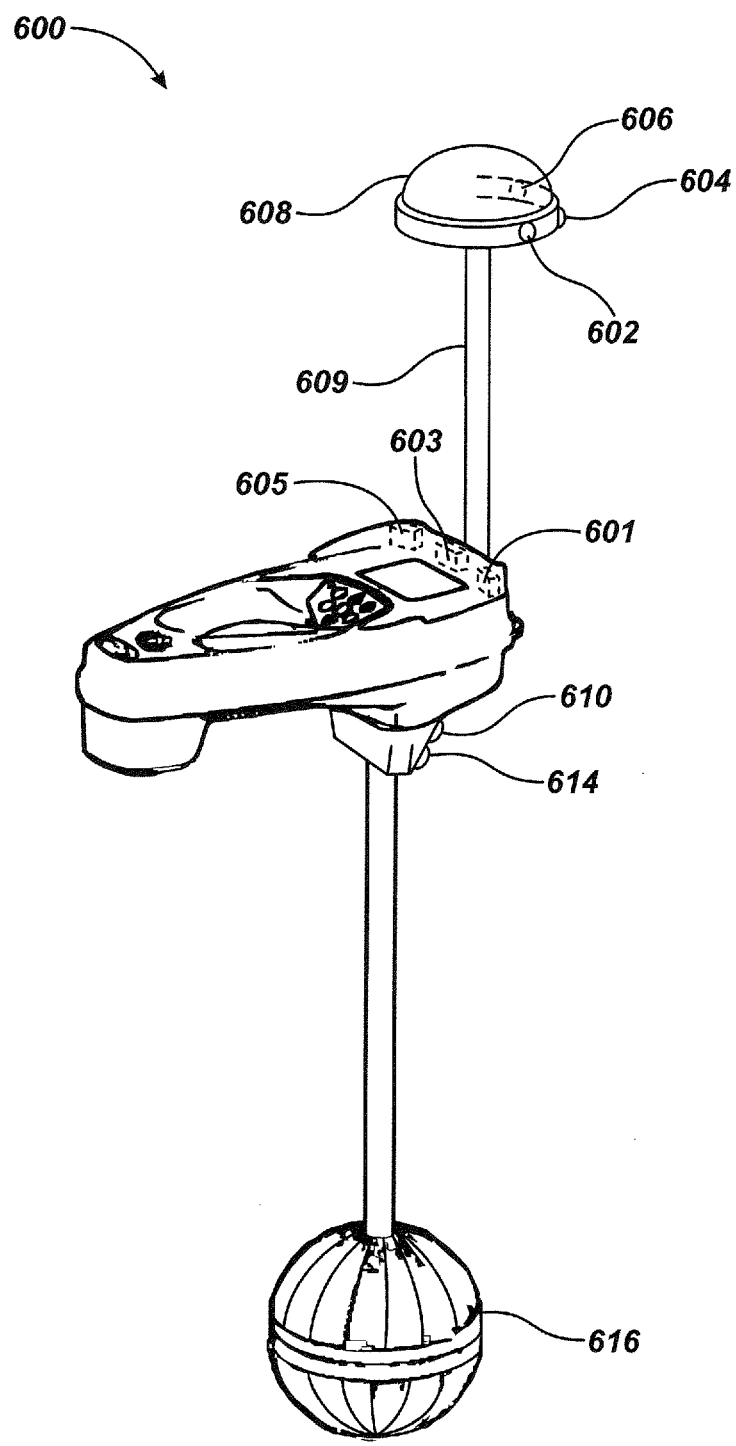
FIG. 6 is an isometric view of an alternate embodiment of the locator of the present invention incorporating a raised GPS antenna and an alternate locator antenna array.

FIG. 6 illustrates another embodiment of a multiple camera enabled GPS masted locator 600 in accordance with the present invention. The GPS masted locator 600 incorporates an upper and lower set of mounted cameras including a lower right-hand camera 601, a right-hand upper camera 602, a lower central camera 603, a central upper camera 604, a lower left camera 605, and a left-hand upper camera 606. The upper cameras are mounted inside a GPS antenna enclosure 608 elevated by means of an attached antenna support mast 609. The upper cameras are oriented to capture an additional and overlapping set of fields of view due to their elevation compared to the lower cameras. Similar to previous embodiment (in FIG. 5), the GPS masted locator 600 supports an upper laser diode enclosure 610 and a lower laser diode enclosure 614 to provide calibration points on the ground ahead of the GPS masted locator 600 for use in image processing. In FIG. 6 a single omnidirectional antenna array 616 is shown. Other antenna configurations suitable to the purpose may be used instead, such as the array shown in previous embodiments (206, 208, 210, and 212 in FIG. 2).

Figure 7:
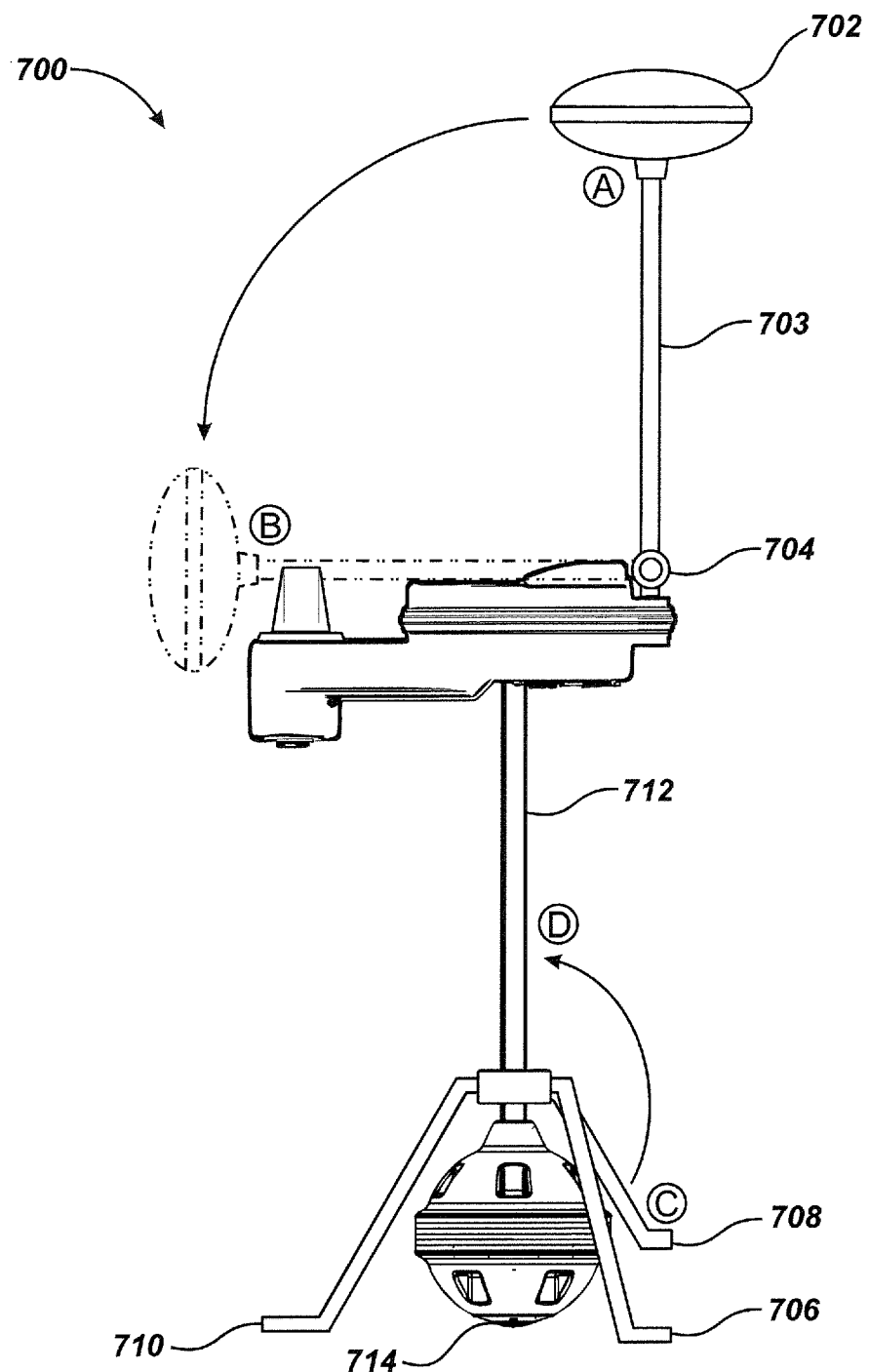
FIG. 7 is a side elevation view of another embodiment of a locator in accordance with the present invention that utilizes a single multi-dimensional antenna array with a folding GPS antenna and legs.

In one aspect of the present invention a locator supports folding legs for use in a fixed unmoving position and a hinged GPS antenna mast for ease of transport. FIG. 7 illustrates these aspects of this embodiment. In FIG. 7 a folding GPS mast locator system 700 includes a GPS antenna shell 702 attached by means of a folding GPS mast 703 at a GPS mast hinge 704. For transport, the folding GPS mast 703 and the GPS antenna shell 702 fold down such that the GPS antenna shell 702 moves from position A to position B. The folding GPS mast 703 may also be folded forward approximately one hundred and eighty degrees in alignment with a lower antenna support 712 for storage and transport. The folding GPS mast locator system 700 in this embodiment may be stably situated in place by means of three folding legs: a left leg 706, a right leg 708, and a front leg 710, each of which is hinged or connected by other means where it connects to the lower antenna support 712. In use the legs extend downward and support an antenna array 714 a fixed distance above the ground. When taken down for transport the hinged legs are raised up against the mast—for example, the right leg 708 moves from position "C" to position "D" in FIG. 7. The legs 706, 708, 710, and the antenna mast 716 are held in their upper and lower positions by friction, snaps, clips, or similar means. This configuration is also useful for mapping a moving dipole transmitter (Sonde) where it is desirable that the folding GPS mast locator system 700 remain in a fixed unmoving position. Examples of such Sondes may be found in U.S. Pat. No. 7,221,136 granted to Mark S. Olsson on May 22, 2007, and assigned to SeekTech, Inc., the entire disclosure of which is hereby incorporated by reference.

Figure 8:
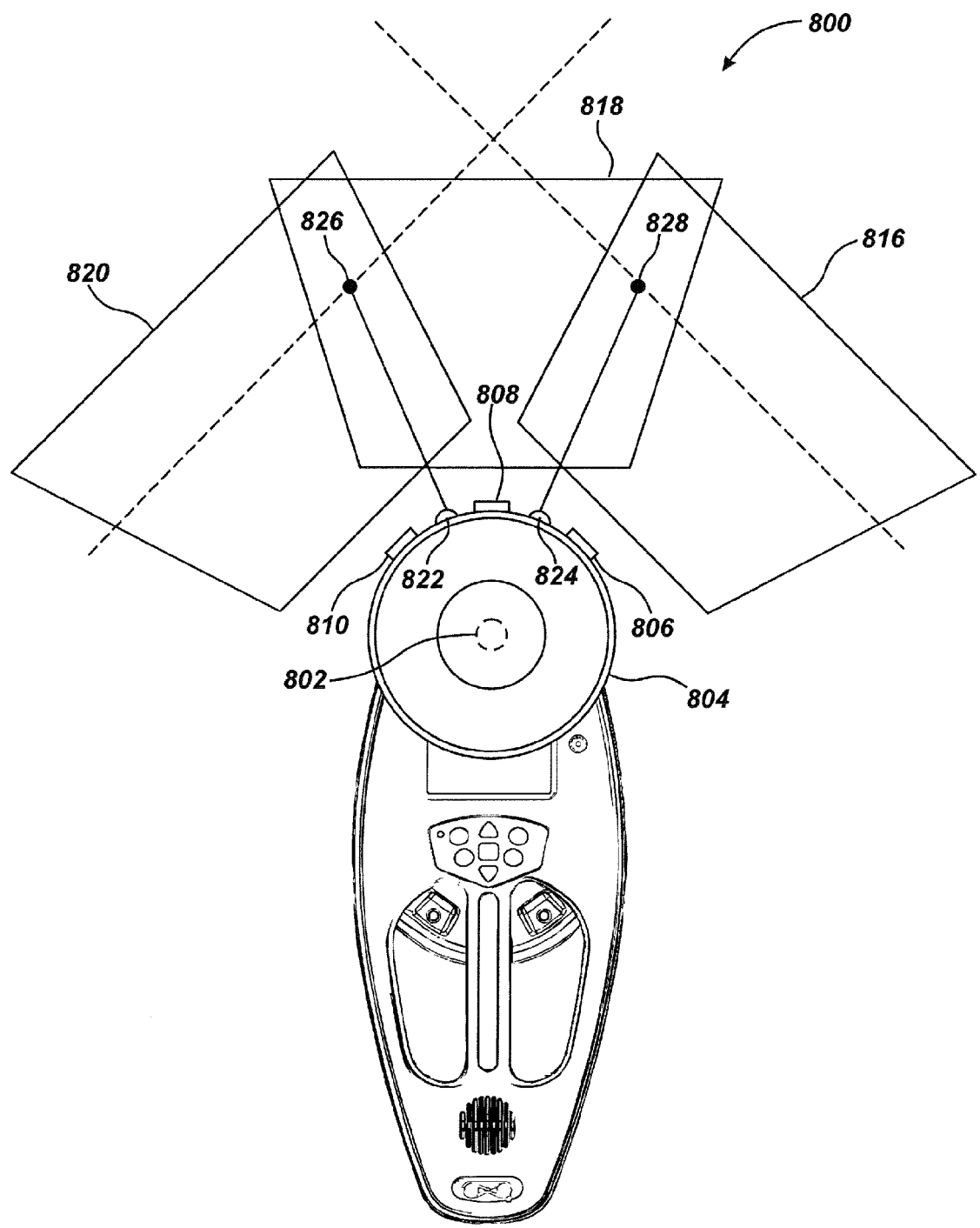
FIG. 8 is an enlarged top plan view of a locator with an incorporated GPS mast incorporating strobed spotting lasers for mapping enhancement.

FIG. 8 presents a top-down view of an alternative embodiment of an imaging locator 800 of the present invention. In FIG. 8 the imaging locator 800 viewed from above supports a GPS antenna mast 802 onto which is mounted a GPS antenna assembly 804. The GPS antenna assembly 804 also supports three cameras, a right camera 806, a center camera 808, and a left camera 810 oriented at known azimuthal angles relative to the central axis of the imaging locator 800 as well as each set to a predetermined tilt down angle with respect to the horizon. Each of the cameras 806, 808, 810 produce an image area, a right image area 816, a center image area 818, and a left image area 820, based on the orientation of each camera and the shape and slope of the earth's surface and the height above the ground. A left laser pattern generator 822, and a right laser pattern generator 824, may also be attached to the GPS antenna assembly 804 producing a left calibration point or pattern 826 and a right calibration point or pattern 828 in the overlapping regions of adjacent images that can be usefully employed in image processing and measurement. The dashed line indicates a line laser pattern which may be usefully produced with a cylindrical lens in the laser beam path.

Figure 9A:
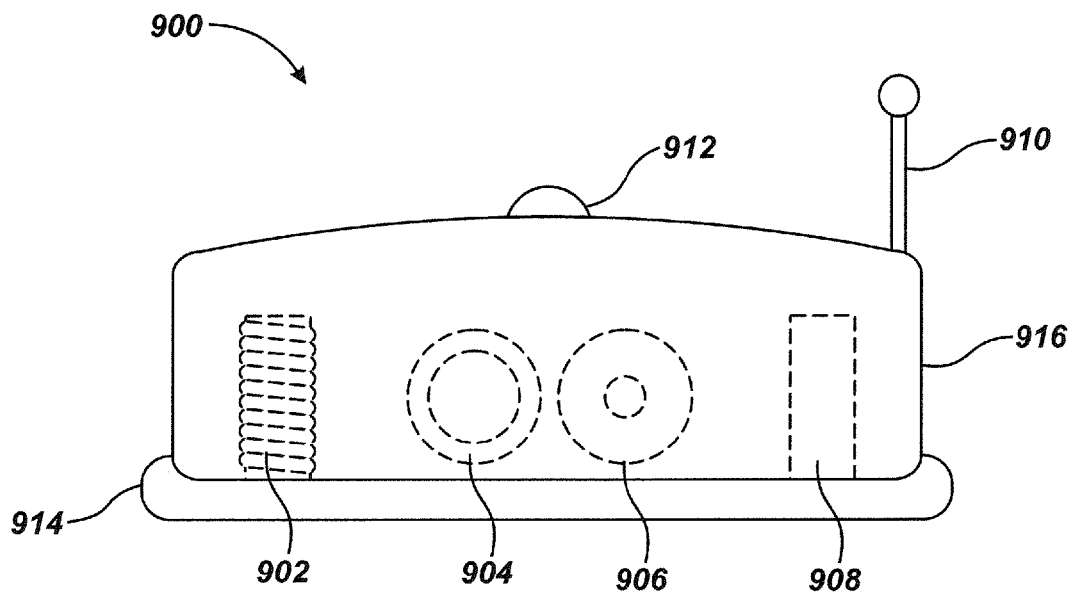
FIG. 9A is a side elevation view of a beacon device for use with a mapping locator.
Figure 9B:
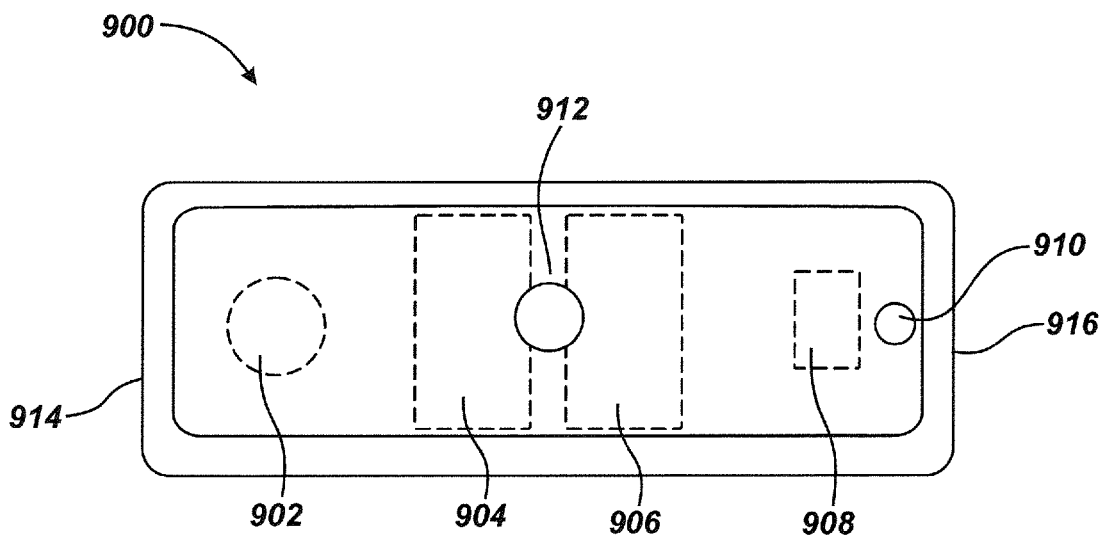
FIG. 9B is a top plan view of the beacon device of FIG. 9A.

FIG. 9A is a side view of a beacon device for use in mapping operations. In one embodiment of the present invention, one or more self-powered beacons 900 may be deployed to known locations in the site of operation, providing a known fixed location and capable of wireless communication with a locator. An example of such a beacon is illustrated in FIGS. 9A and 9B from side and top views respectively. The self-powered beacon 900 sends out a locatable signal at a known frequency by means of a standard coil 902 and is powered by on-board batteries such as two C-cells 904 and 906. One or more coils for producing a locatable signal of different frequency or orientation may be employed. The signature frequency of the self-powered beacon 900 may be detected by the omnidirectional antenna array used in the locator of the present invention (such as imaging locator 202 in FIG. 2) and the signal strength and bearing can be included in computing the precise location of the locator relative to the self-powered beacon 900. Radio link frequencies such as the ISM band (around 915 MHz) may be separately used, for example, for data transmissions between a beacon and locator or between a beacon and other units. The self-powered beacon 900 may optionally be equipped with a GPS unit 908 and transmit encoded GPS data (by means of a radio link antenna 910) for its location to a locator capable of also detecting the signal from the standard coil 902, providing further refinement of its position relative to the locator. DGPS techniques, using the beacon as a fixed reference may be employed to allow the movement of the locator relative to the fixed, unmoving beacon to be accurately determined, either in real time or during post processing of recorded GPS data. A blinking LED 912 is located on the top of a beacon housing base 914 which is attached to a beacon housing 916 of the self-powered beacon 900 by means of snaps, threads, friction or other convenient means. To facilitate in finding the beacon and for use in optical surveying of its location when required, as well as for identifying it in image processing, the blinking LED 912 may be pulsed under radio control so that its position within an image may be resolved. Image subtraction techniques may be employed where the blinking LED 912 is strobed on and off during sequential images taken by an imaging locator during a short time interval.

Figure 10:
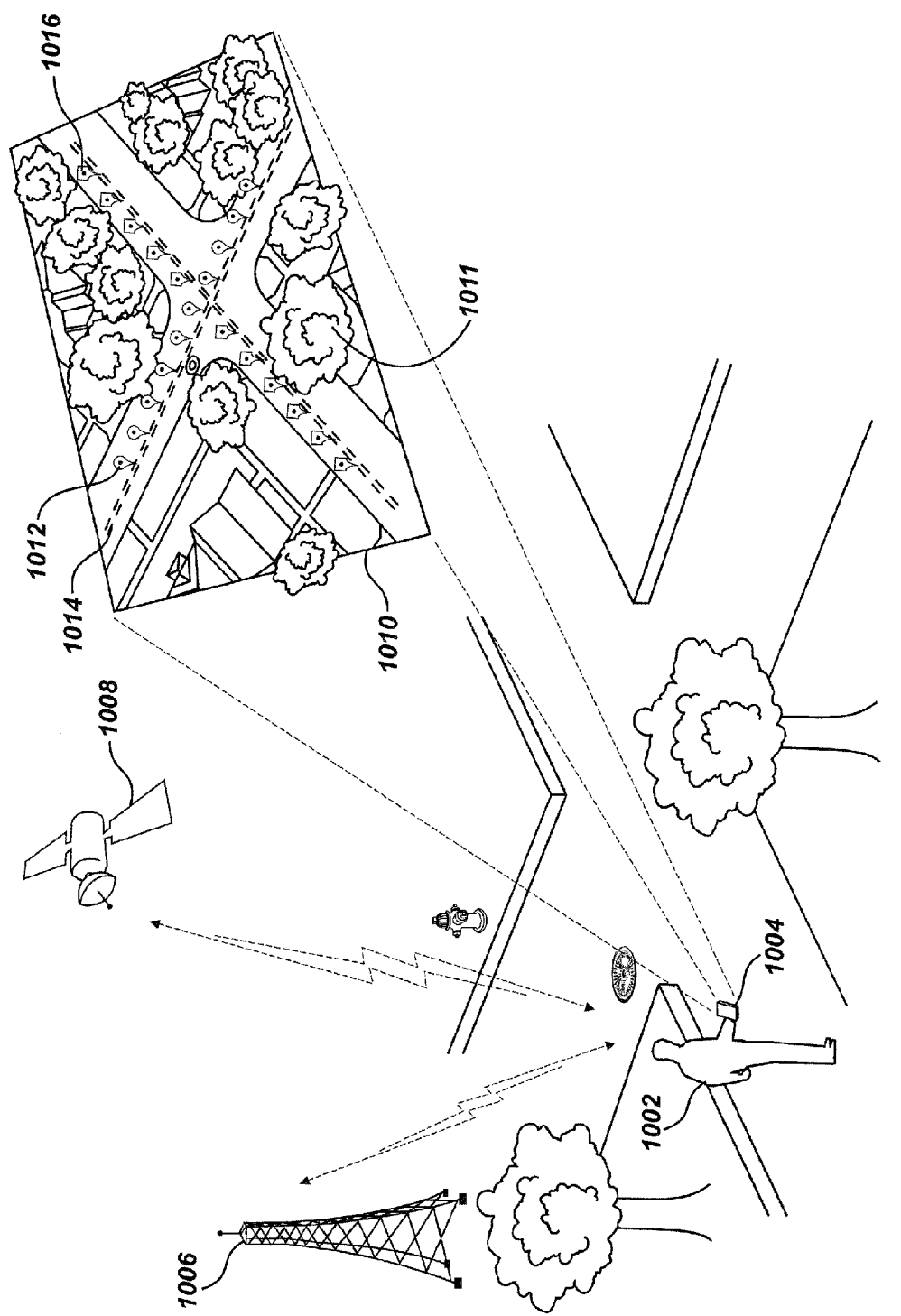
FIG. 10 diagrammatically illustrates the use of the integrated information captured during the locate process to create an augmented reality mapping utility for a utility agent.

In FIG. 10, a construction surveyor 1002 is illustrated surveying an area where utility information has been previously collected using a locator (such as that illustrated in FIG. 1) and is receiving displayed information by means of an intelligent hand-held device or smart-phone 1004 which is being wirelessly transmitted from a cell tower 1006 and is also receiving GPS positional information from a satellite constellation 1008 and is shown on display 1010 on which live images from a camera in the intelligent hand-held device or smart-phone 1004 are shown with utility traces as overlays. In an alternate embodiment a virtual reality construct may be displayed using downloaded images from a service such as Google Earth™. Such information may be transmitted by a wireless network or the cell tower 1006 or may be preloaded into the intelligent hand-held device or smart-phone 1004. Display 1010 displays a geo-referenced photo image 1011 which may be integrated with terrain images (as in FIG. 4) from an on-line resource. In the display 1010, symbolic overlays for a gas line overlay 1012, a water line overlay 1014, and a phone cable overlay 1016 are displayed based on previously acquired data. In typical use, the display would be scalable by the user to provide high-precision visual orientation to the buried utilities from any point in the scene, relative to observable features or GPS location when available. Such a display might be used to guide the operator of an excavator so as to avoid damage to buried utilities. Such a field display capability can be used to plan and execute construction around buried utilities and can reduce the chances of damage and injury during the construction process.

Figure 11:
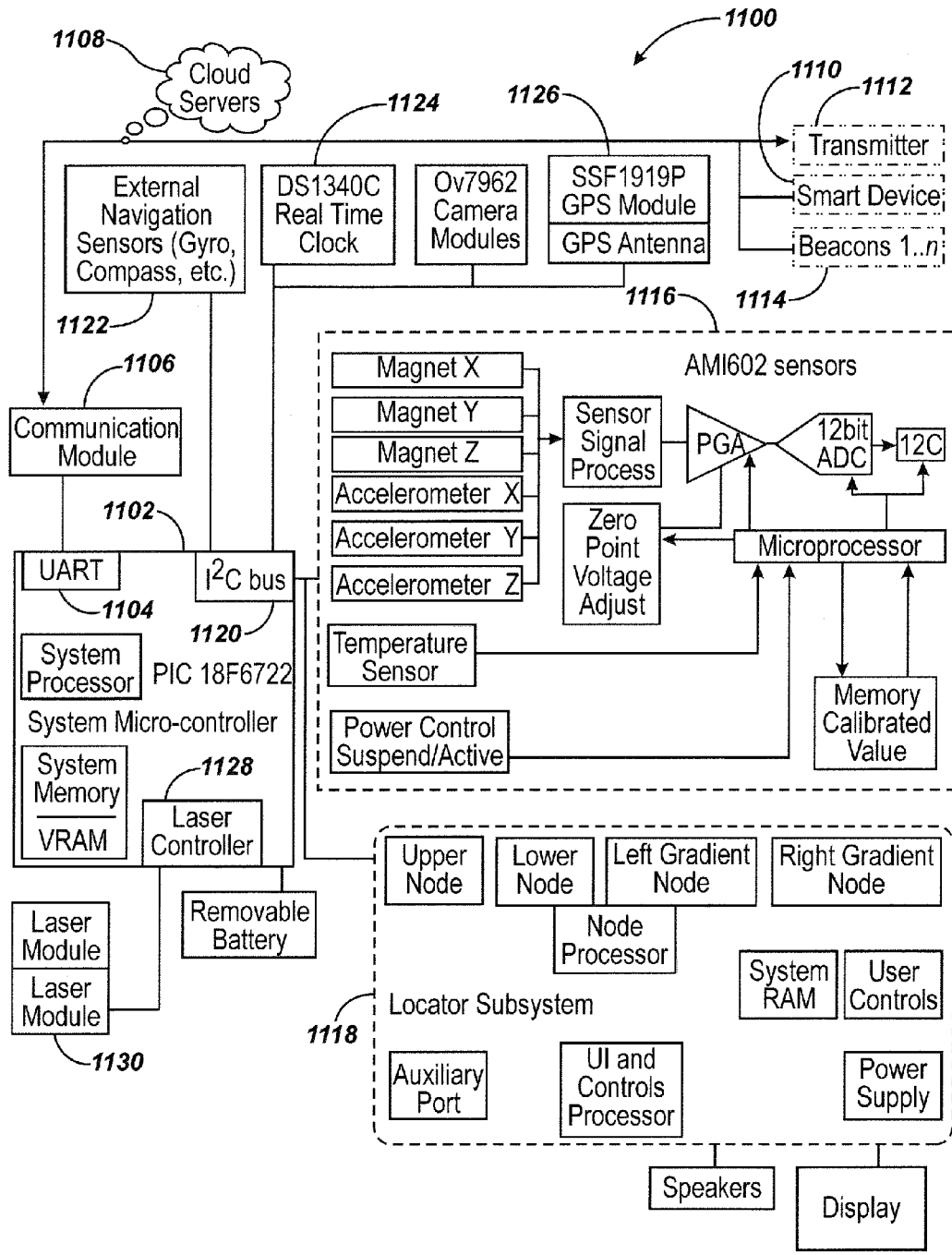
FIG. 11 is a block diagram illustrating the relationship of sensors and other elements in an embodiment of the present invention.

In FIG. 11 the components of an embodiment of the enhanced locator system 1100 are illustrated in block diagram form. A system microcontroller 1102 such as a PIC18F6722 is connected by a UART chip 1104 to a communication module 1106 which maintains connections with internet cloud servers 1108, a local smart hand-held device 1110, optionally a locating transmitter 1112, and optionally one or more self-powered beacons 1114. The PIC18F6722 is a 64/80-Pin, 1-Mbit, Enhanced Flash microcontroller with 10-Bit A/D up to 13 channels. It is available from Microchip Technology Inc., 2355 West Chandler Blvd., Chandler, Arizona, USA 85224-6199. The enhanced locator system 1100 carries a 3-axis accelerometer and 3-axis magnetic sensor chip 1116 such as the AMI602 from Aichi Steel Corporation, Electro-Magnetic Products. The magnetic sensor chip 1116 is a 6-axis motion sensor which incorporates a 3-axis magnetometer and a 3-axis accelerometer. The controller IC of the AMI602 consists of a circuit for sensor elements, an amplifier capable of compensating each sensor's offset and setting appropriate sensitivity values, a temperature sensor, a 12 bit A/D converter, an $I^2C$ serial output circuit, a constant voltage circuit for power control and an 8032 micro-processor controlling each circuit. An alternate device is the STMicroelectronics LSM303DLH, produced by STMicroelectronics, 39, Chemin du Champ des Filles, C. P. 21 CH 1228 Plan-Les-Ouates, STMicroelectronics, 39, Chemin du Champ des Filles, C. P. 21 CH 1228 Plan-Les-Ouates, Geneva, Switzerland.

The system microcontroller 1102 is connected to a locator subsystem 1118 by means of an $I^2C$ bus controller 1120 and to the magnetic sensor chip 1116. The system microcontroller 1102 integrates electromagnetic data received from its upper and lower antenna nodes and its two gradient coil antennas. Upper and lower antenna nodes are omnidirectional, each being capable of measurements in three dimensions. Additional external sensors 1122 may optionally include gyroscopic sensors, compass modules, sound sensors, local imaging devices and other optional sensing devices. A real-time clock chip 1124 (such as the DS1340C with built-in calendar and clock, available from Maxim/Dallas Semiconductor, at Maxim Integrated Products, Inc., 120 San Gabriel Drive, Sunnyvale, Calif. 94086) may optionally be installed. Alternatively the clock functions may be provided by a time-base function provided by a GPS unit such as the SSF1919P, manufactured by Smart Design Technology of 20f-8, No. 107, Sec 1, Jhongshan Rd., Sinjhuang City, Taiwan. A high precision OEM GPS module 1126, such as the Ultra High Sensitivity SiRF, StarIII 7989 GPS Module with Slim Path Antenna manufactured by Smart Design Technology Co., Ltd., 20F-8, No. 107, Sec 1, Jhongshan Rd., Sinjhuang City, Taipei County 242, Taiwan or alternatively any one of OEMV-1DF-L1L2, OEMV-1DF-RT2, OEMV-1DF-L1, OEMV-1DF-RT20, OEMV-1DF-SBAS, manufactured by NovAtel Inc. 1120-68th Avenue N.E. Calgary, Alberta, Canada T2E 8S5. The system microcontroller 1102 may also have a programmed laser controller 1128 on board which provides control pulses for a set of laser modules 1130. The optional gyroscopic sensor would be, for example, a STMicroelectronics L3G4200D, available from STMicroelectronics of Geneva, Switzerland cited above. The configuration of particular elements and subsystems may vary with the intended application.

The use of the present invention in various embodiments enables the production and application of a composite view of the surface and sub-surface structures in a framework coordinated with auxiliary data from sensors, locator devices, and associated locational beacons. Auxiliary data relevant to the images will be stored to create and maintain a logical association with these images and their physical or relative location. The images may be associated with the auxiliary data directly by simply storing them together. Alternatively the images may be stored as a sequence of files or on a particular storage medium such as a hard drive while the auxiliary data are stored in a separate file or in a separate storage medium such as flash memory. The separately stored data may be associated with pointers or index tables. The images and auxiliary data may also take the form of a relational database, a series of relational databases, or a group of many inter-referenced databases. This database or databases are used to organize the auxiliary data in a relational and highly optimized fashion, associating the auxiliary data with related images via a lookup table indicating the logical and physical location of the image files.

Figure 12:
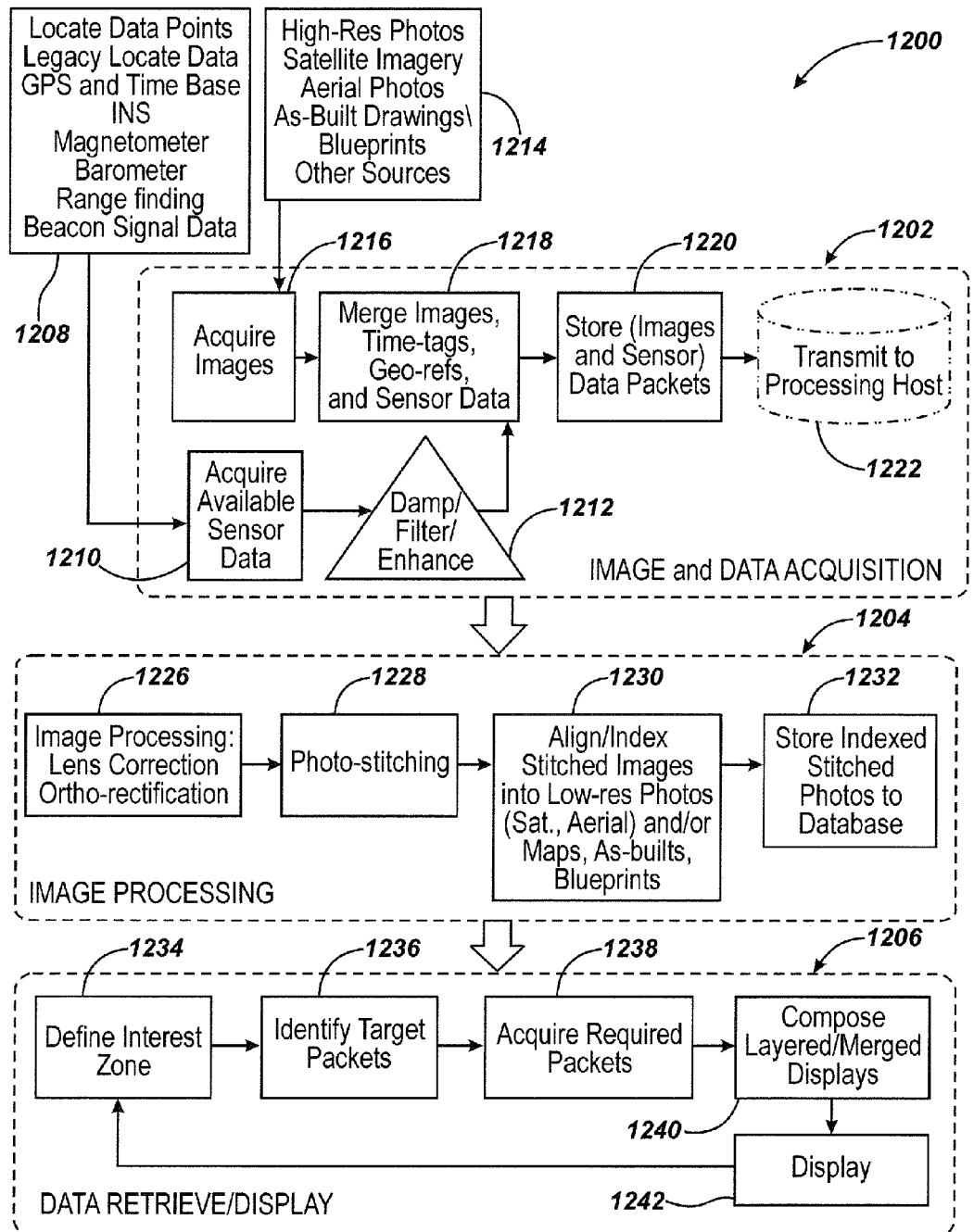
FIG. 12 is a high-level flow-chart illustrating the image and data acquisition, processing, retrieval and display of an embodiment of the present invention during its use.

The high-level process of the present invention in producing such a composite of information has three major phases. The system acquires sufficient data to build an integrated data set portraying the site or area of interest. The raw data must then be processed so that it is correctly integrated and aligned. Finally, the data must be retrieved and displayed in a timely manner for the application of interest, which can vary. Turning to FIG. 12, these major phases are shown in sequence. A process of data flow 1200 is shown in three sub-blocks: a data and image acquisition phase 1202, a data and image processing phase 1204, and a data retrieval and display phase 1206.

Two major processes operate in parallel in the data and image acquisition phase 1202. Multiple sources of sensor data 1208 may include locate detection data points, legacy locate data retrieved from past locates, GPS correlations mapped against time tags when available, magnetometer readings, barometric readings, data relayed from beacons, and sensor data from on-board compasses, accelerometers, or other sensors with which the system may be equipped. Raw sensor data acquired in a sensor acquisition step 1210 may require a damping and filtering process step 1212 to damp, filter or enhance it. Imagery sources 1214 may include high resolution photos taken in real-time by a locator system in the field, satellite imagery, aerial photos, digital representation of as-built utility drawings or blueprints, or other image sources. Sensor data from the sensor acquisition step 1210 and image data from an image acquisition step 1216 is then merged in a data and imagery merging step 1218 with geo-reference and time tags and stored in a storage step 1220 in data packets. These data packets may be optionally transmitted to a processing host 1222 or they may be processed on-board the acquiring platform. Streaming the raw digital data for subsequent post-processing allows for greater processing power to be applied, including, for example, processing for passive EM signatures and identifying additional buried lines that might have been missed, thus allowing improved accuracy in the composite site view that is ultimately produced.

The post processing that occurs in the data and image processing phase 1204 of images includes image rectification and lens corrections 1226, photo-stitching 1228, and aligning, indexing, integration and referencing 1230 of high resolution local photos with lower resolution images such as satellite, aerial, blueprint, or as-built drawings. The rectified, photo-stitched and integrated image sets are then stored in a database 1232. Such a database may be integrated into the local platform or it may reside on a remote server. All original data may also be so stored.

The application of this data in providing composite data views for use in the field may occur in various ways depending on the application. The general case for the data retrieval and display phase 1206 requires identifying the zone of interest 1234 and identifying target data packets 1236 for the region required. The acquisition of the required data packets 1238 may be done wirelessly from a remote server, or locally from an on-board database, or the data may be transferred through a removable medium such as a thumb-drive. The step of composing a merged display 1240 and then a final display step 1242 of the acquired data may be differently composed depending on the particular application. For example, a virtual reality display showing an overlay of locate measurements over a high resolution surface photograph (as described in FIG. 10) may be the best display for a locator returning to verify past results. A two or three-dimensional SubView™ composite (showing surface and subterranean features in three dimensions) may be preferable for use by an excavator.

Figure 13:
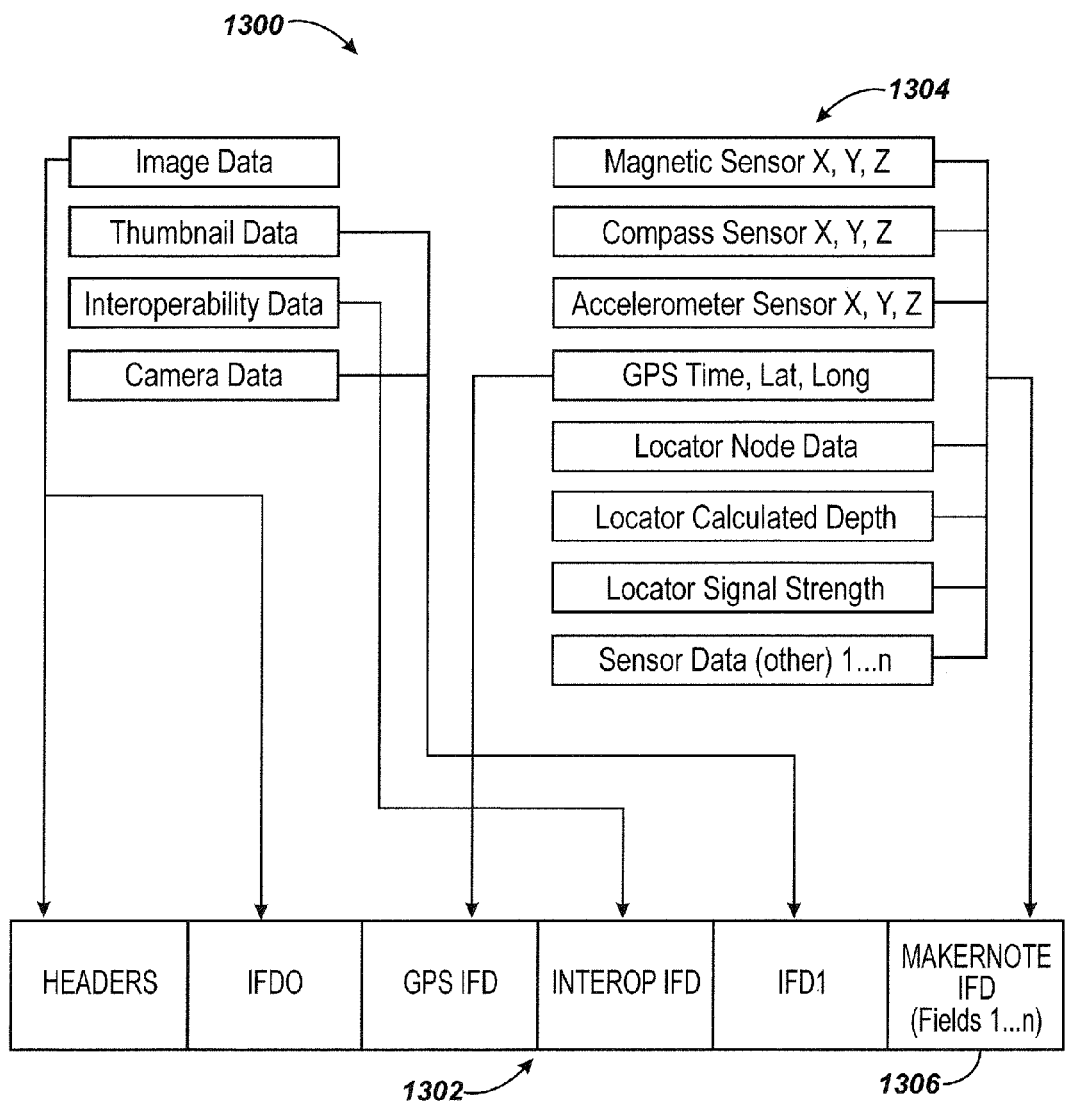
FIG. 13 is a flow-chart illustrating the process of transformation of high resolution locator-captured images and their integration sensor data into site data packets.

FIG. 13 provides a more detailed exposition of an image data fusing process 1300 using data from photos and sensors into an image data packet 1302. The process shown in FIG. 13 uses an EXIF file format, an extension of the standard JPEG image file structure. The EXIF file structure is widely used and well-established in the digital image industry, and lends itself conveniently to establishing a data packet with various additional data items such as sensor values added to an image. However it will be readily apparent that other standard or customized file formats and data structures may be used. Various sensor data items 1304 may have dedicated fields in a customized file structure. In this example, they are placed in a set of customized metadata fields 1306 under the EXIF MakerNote tag. The number of the customized metadata fields 1306 assigned to the MakerNote IFD may vary with the number of external sensors being used in a specific application. Communication packets such as from a remote navigating beacon, might for example, require additional MakerNote fields. The major data blocks of an EXIF file structure are shown in FIG. 13, and the allocation of raw data from camera, locator, and sensors into the image data packet 1302 is mapped.

Figure 14:
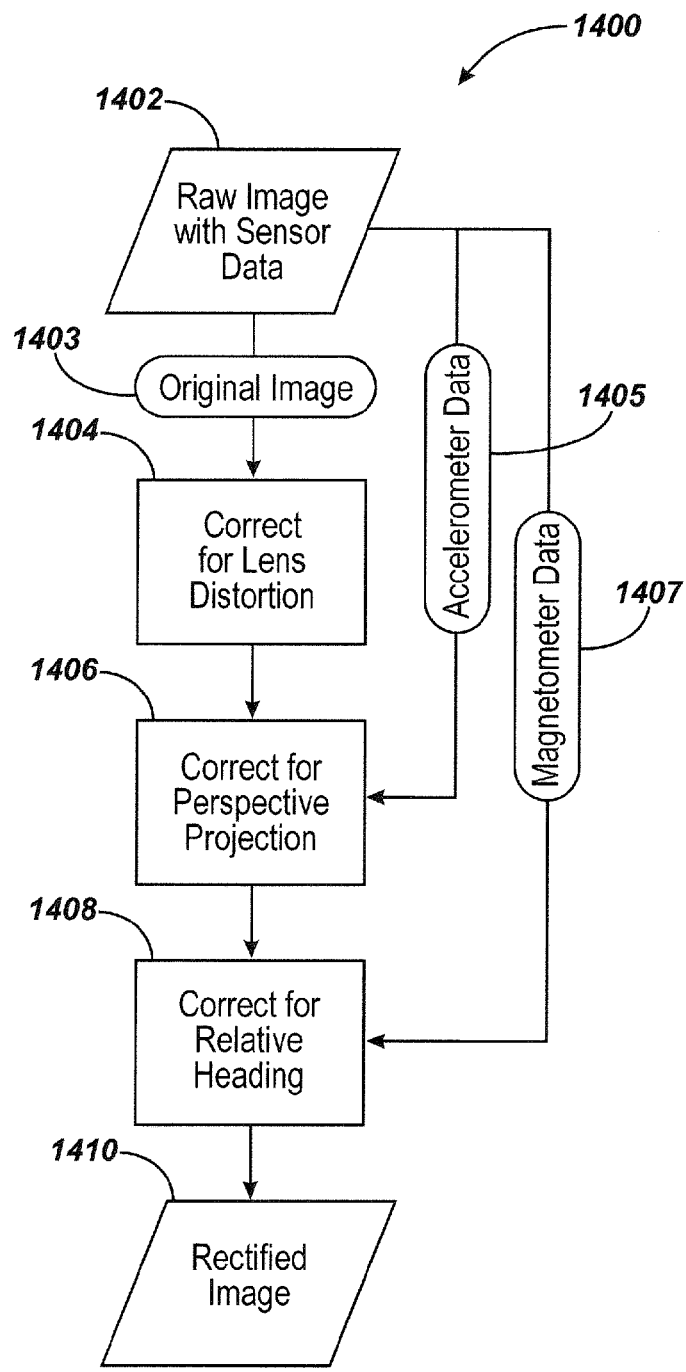
FIG. 14 is a flow chart illustrating the image rectification and lens correction of locate images.

In FIG. 14 a process of image rectification 1400 is shown and detailed. A raw image and sensor data packet 1402 is processed by subjecting an original image data set 1403 to a lens distortion correction process 1404 for lens distortion, and a second perspective correction process 1406 which corrects for perspective projection. Accelerometer data 1405 from the original raw image and sensor data packet 1402 is used to correct for the distortion in the horizontal plane due to pitch and roll, and project the image to a homographical space where the angle of the camera would be consistent with the direction of gravity (birds-eye view). The image is then integrated with magnetic sensor data 1407 and then subjected to a heading correction process 1408 which corrects for relative heading in the image, making it possible to provide a constant image orientation relative to true north. The known local tilt and deviation of the Earth's magnetic field may also be used to refine perspective correction. The corrected image and sensor data are combined in rectified images 1410 as formed data packets. Each of these operations also updates an alpha layer in which pixels in a rectangular array which lie outside the original, non-rectangular rectified image are transparent.

Figure 15:
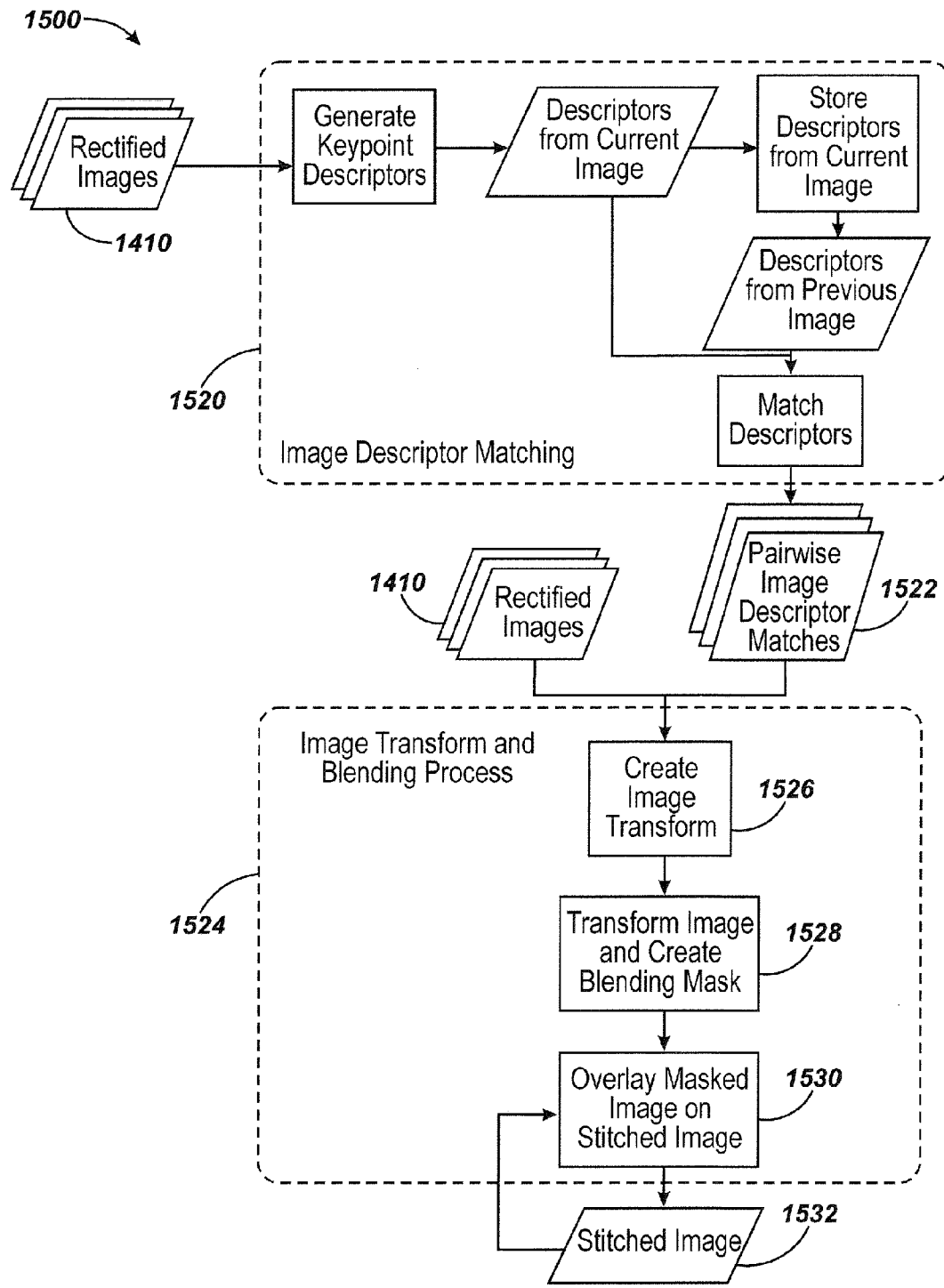
FIG. 15 is a flow diagram illustrating a method for stitching separate images into a composite image.

In FIG. 15 an image stitching process 1500 takes the rectified images 1410 and integrates them into composite images. This begins with an image descriptor matching process 1520 for generating key point descriptors. The rectified images 1410 are taken in successive pairs (images 1 and 2, images 2 and 3, images 3 and 4, etc.)
1) Image descriptors are generated using an algorithm to calculate a weight-space for a bilateral filter:

$$W_s = \sum_{p \in N} f(p - s) * g(I_p - I_s)$$

where s is the position of a pixel in the input image I and p is one of the neighbors of s in the neighborhood N. The function $f$ and g are weighting functions based on the differences of the pixel locations and pixel intensities, respectively. In this implementation, $f$ is Gaussian and g is a threshold.

a) The resulting weight-space, W, is normalized and inverted (using the image processing forms of these terms) to highlight regions of relatively higher contrast, and mute regions of relatively lower contrast.
b) The weight-space is then segmented using a defined threshold—the resulting segmented image can be visualized as a set of various sized and shaped blobs that correspond to areas of interest in the image (edges and objects).
c) The segmentation is subjected to a series of weighted average filters to find and remove very small blobs and noise.
d) Each of the blobs in the segmentation is then given a unique identification number (ID) and analyzed to define several properties including the blobs mass, centroid, and degree of hollowness or solidity.
e) Blobs that exceed a defined mass or hollowness (which generally represent very large objects/edges and intersecting objects/edges) are further analyzed to determine several "sub-centroids" in the blob (determined by locating peaks in the Euclidean distance between each pixel in the blob and the nearest pixel outside the blob).
f) A set of key point locations is compiled from the centroids and ID's generated in d) and e) above.
g) A set of descriptors is compiled for each key point that represents the relative locations (difference of pixel coordinates) and ID's of the twenty closest key points within a defined radius of the key point. Each key point descriptor therefore consists of a (20×3) element matrix. If the key point has less than 20 neighboring key points within the defined radius, zeros are inserted for the remaining elements of the matrix.

2) For each consecutive pair of images, the image descriptor matching process 1520 then matches descriptors using the key points generated.
   a) A distance map is created for each image based on its key point locations, where each pixel in the distance map represents the Euclidean distance to the nearest key point in the input image. An ID map is created at the same time to indicate which key point each pixel is nearest to.
   b) A subset of the key points from each image are selected based on their proximity to the central region of the image.
   c) The descriptors for each of the key points in this subset are then cross compared with the subset of key points from the other image to find potential matches:
      (1) An error for each potential key point match is constructed by summing the values of the distance map at the locations of the twenty relative locations in one key point's descriptors relative to the other key point (where the latter key point is from the same image corresponding to the distance map being used and the former corresponds to the other image).
      (2) This resulting error is then added to the error found where the image roles are reversed (using the other distance map and reversing the roles of the two key points).
      (3) The potential match for each key point that has the minimum error is retained and the rest are discarded.
   d) The set of potential matches is then further refined with the relative locations of each of the potential key points in each match:
      i) The difference between the locations of the two key points in each match is calculated.
      ii) A map is then constructed which represents the population density of the location differences. The fact that the input rectified images 1410 were rectified is strongly leveraged here. Since the input rectified images 1410 are rectified, the differences between the matched key points should be close to constant.
      iii) The area around the highest density of potential key point matches are retained as a set of confirmed pairwise image descriptor matches 1522 and the rest are discarded.
   e) Once the set of pairwise image descriptor matches 1522 are found, the algorithm then tries to find the entire region of overlap between the two images by traversing the neighboring key points in the descriptors:
      i) The location of the matched key points neighbors are predicted in the other image using the key points' descriptors.
      ii) The ID of the neighbor's potential match is found using the ID map.
      iii) If two or more matched key points predict the same potential match for their neighbor (same ID's for both the neighbor and its potential match), potential match is kept and the predicted location for the match becomes the average of the individual predictions. Otherwise the match is discarded.
      iv) An error for each potential match is then set to the value of the predicted location in the corresponding distance map. If the error is below a certain threshold, the match is kept. Otherwise it is discarded.
      v) The resulting matches are then added to the set of pairwise image descriptor matches 1522 and the process is repeated until no further matches are made.

With the rectified images 1410, and the pairwise image descriptor matches 1522 as inputs, an image transform and blending process 1524 is then performed to transform and blend images.
1) An image transform process 1526 is applied.
   a) An image transformation matrix is found that minimizes the error between the coordinates of the key points in one image and the transformed key point's coordinates of the other. Generally the transform is limited to only changes in translation, rotation and scale (but other transforms such as affine transformation or projection could be performed instead).
   b) The transform from one image space to the image space of any of the previous images can be calculated by multiplying the transformation matrices of all of the intermediate image pairs between the two images.
2) The image is transformed and a blending mask is created 1528.
   a) The relative location of the centroid of the transformed image is optionally compared to the location of the centroid of the previous image to find a line that bisects the transformed image at a point in the middle of the overlap. All of the pixels in the alpha channel for the transformed image are set to transparent.
   b) The edges in the alpha channel of the transformed image are then softened so that sharp edges will not be apparent in the final stitched image. This softening is performed through a hyperbolic tangent (tan h) based transition from transparent to opaque along each of the edges.
3) Stitched images are generated 1530, in a process by overlaying the transformed image without the mask applied with a layer comprising the transformed image with the mask applied An existing stitched image 1532 is updated by laying images in the following order:

i) Bottom layer: transformed image (no mask applied)
ii) Middle layer: current stitched image
iii) Top layer: transformed image with the mask applied An optional additional step would use the parallax of cameras on a locator, such as described in earlier Figures, in order to calculate corrections for the apparent height of vertical objects in a user's display of a composite image.

Figure 16:
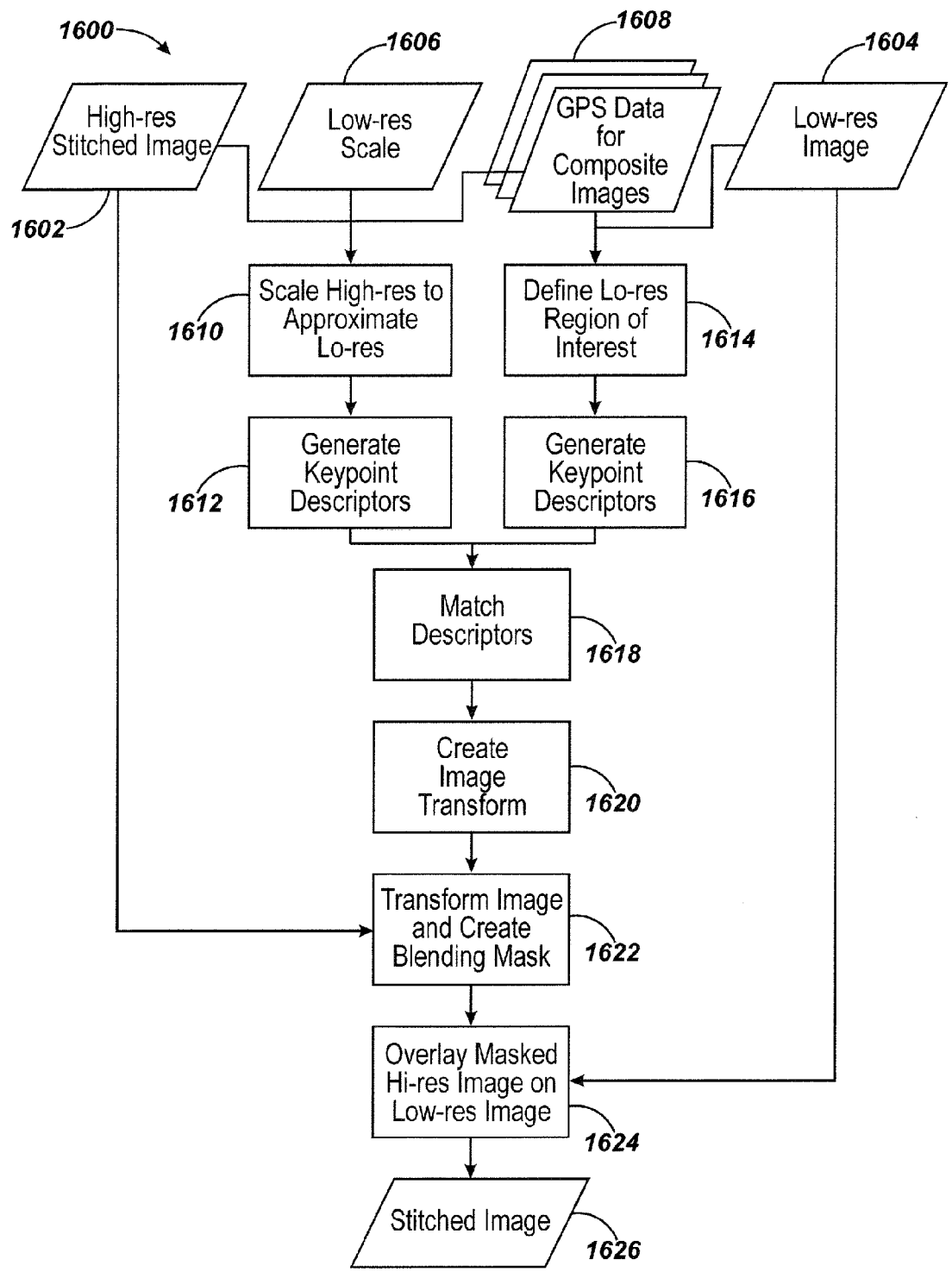
FIG. 16 is a flow diagram illustrating a method for integrating local higher resolution images with lower resolution imagery such as those obtained from satellites.

In FIG. 16 high resolution images and composites thereof are integrated with lower resolution images, or maps, or blue-prints or as-built utility drawings depending on the intended application. For example, on-line satellite imagery for a region of interest may be accessed from Google Maps, Google Earth, Microsoft Bing, Pictometry®, or similar repositories containing geo-referenced high-level imagery. Street-view images may also be used, with special processing.

A general image and map integration process 1600 uses a high resolution stitched image 1602 and a low resolution image 1604 such as an aerial or satellite image. The low resolution image scale 1606 of the low resolution image is identified. GPS tags from the original images 1608 are processed to compute the approximate required scale of the composite image desired. In a step, a high resolution image is scaled to approximate the low resolution scale 1610, and the resultant data is used to identify key points and generate key point descriptors for the low resolution region in step 1612. A low resolution region of interest is defined in step 1614, and keynote descriptors are similarly generated 1616 for the low resolution region of interest in the high resolution images. A process of matching descriptors 1618, creates an image transform 1620, in a transforming images step 1622 and a step of overlaying the images 1624 are as described for FIG. 15. These steps result in a stitched image 1626 integrating the high resolution and low resolution features.

Figure 17:
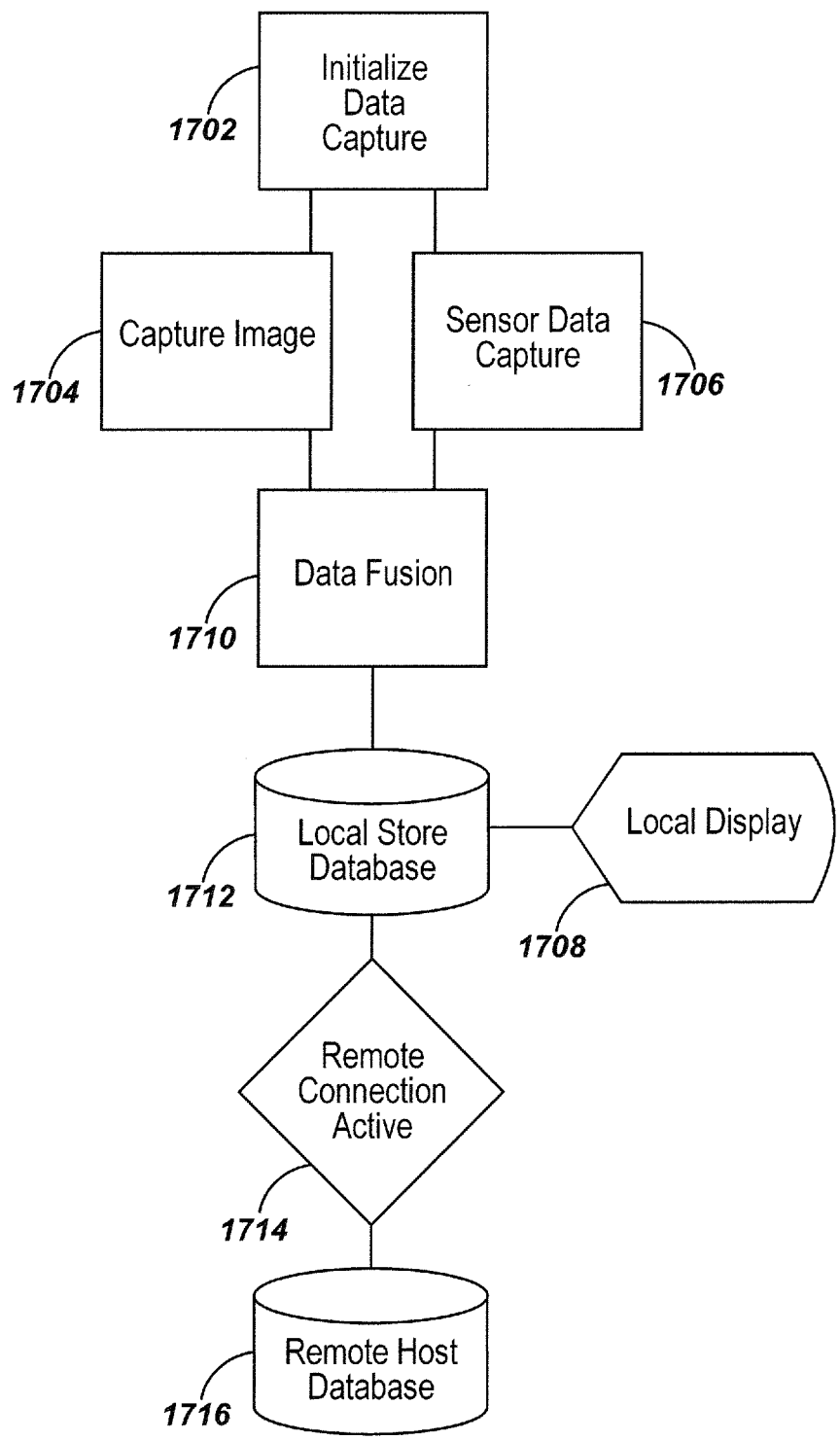
FIG. 17 is a flow diagram illustrating real time image capture during an excavation.

In FIG. 17 a use-case scenario is illustrated in which an excavation unit is equipped with imaging devices herein described, and generates real-time images of the excavation and any utilities it exposes which are transmitted to a database along with sensor data including tool orientation and GPS values.

When an excavation data-capture is initialized in step 1702, real-time images are captured 1704 along with sensor data 1706 including electromagnetic utility data, GPS positional information, accelerometer and compass data, for example. An optional on-board local display 1708 may be employed to guide the excavation process and reduce the likelihood of damage to buried utilities. The data is integrated in a fusion process 1710 such as has been discussed herein, and stored in a local database 1712. If a remote wireless connection 1714 is active, the data may be transferred to a remote host database 1716 for post-processing and storage in a database. If a locator device is built into the on-board sensor, active (using a transmitter) or passive (using signals of opportunity or existing utilities) measurements may be locally processed and incorporated in the on-board local display 1708.

Figure 18:
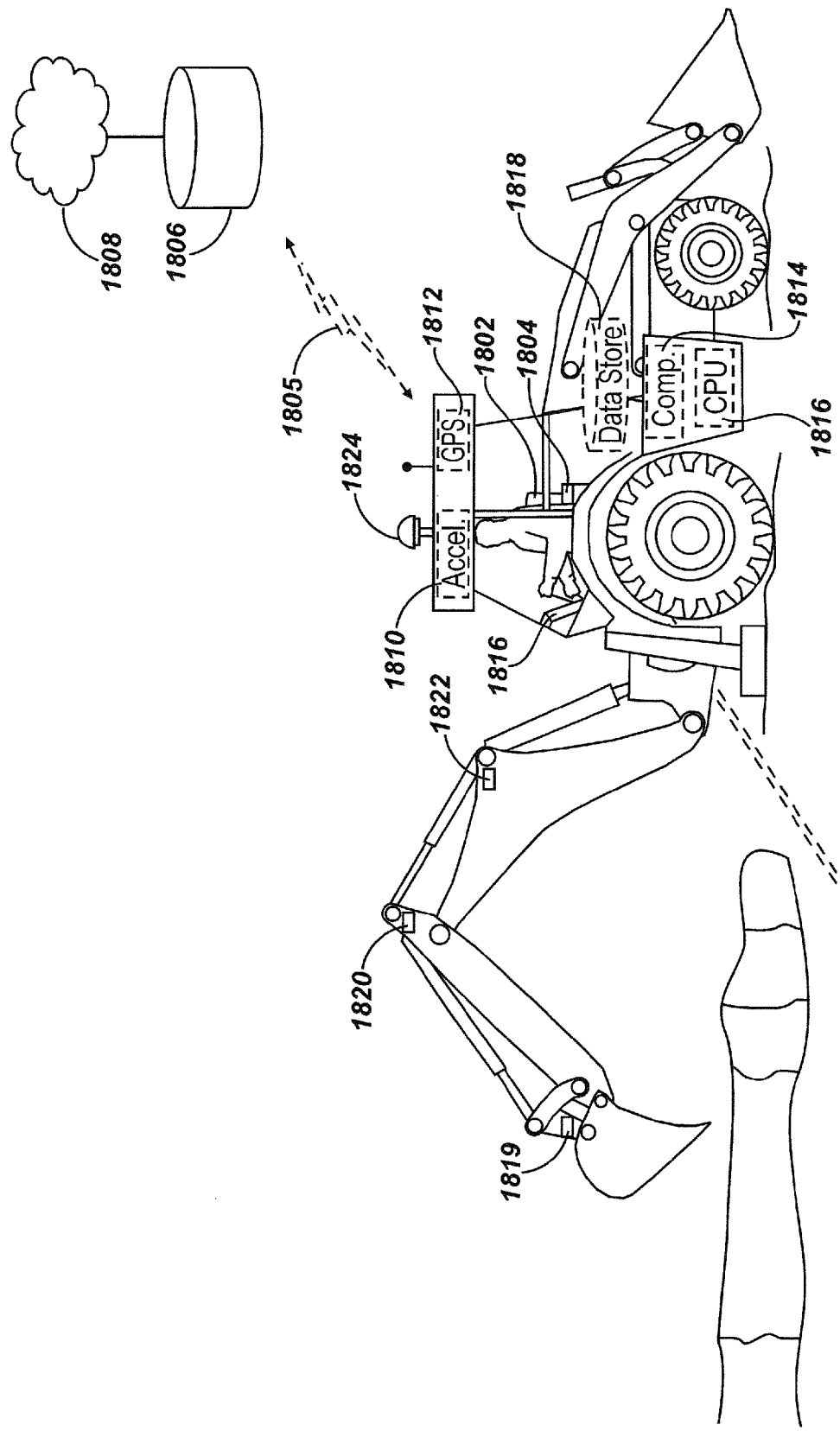
FIG. 18 is a diagrammatic illustration of information being downloaded to, and used by, an excavator operator.

Such captured and stored information may be made available through internet server applications to users with an interest in the particular region, such as those contemplating excavation or utility repair in the area. The real-time use of such information is illustrated in FIG. 18. An excavator operator 1802 using an excavator 1804 uses a wireless connection 1805 to call on information services from a remote server 1806 which is in turn able to access other cloud servers 1808. The excavator 1804 is equipped with sensors including a 3-axis accelerometer 1810, a GPS unit 1812, and a compass unit 1814. An on-board CPU 1816 and local data storage 1818 provide local processing and recording of data. In addition a series of sensors, a first joint sensor assembly 1819, a second joint sensor assembly 1820, and a third joint sensor assembly 1822 may be incorporated to capture angles and location of the digging head. The real-time location and orientation data captured from on-board sensors is processed and transmitted to the remote server 1806 and used to recover historical recorded locate information, images, as-built utility information, or other related data relating to assets, utilities, or geophysical features for the location of the excavator 1804. The cloud servers 1808 may also be used to acquire area images. A composite view incorporating data from all sources is transmitted to the excavator 1804 adjusted for the known location and orientation of the excavator 1804. Such a display may include an augmented reality view which includes representations of known buried utilities, for example, assisting in the safe conduct of the excavation. The excavator system may include an imager or multi-imager array 1824 whose real-time images may also be compared to and integrated with historical imagery or data. Any of the joint sensors assemblies 1819, 1820 or 1822 may include aforementioned omnidirectional antenna arrays (for example the single omnidirectional antenna enclosure 616, shown in FIG. 6) as well to provide an additional level of detected positional accuracy of buried, hidden utilities during the excavation process. Any or all of these joint sensors assemblies may also include imagers or multi-imager arrays to provide a detailed visual audit of the excavation process and to aid in the resolution of any damage claims.

Figure 19:
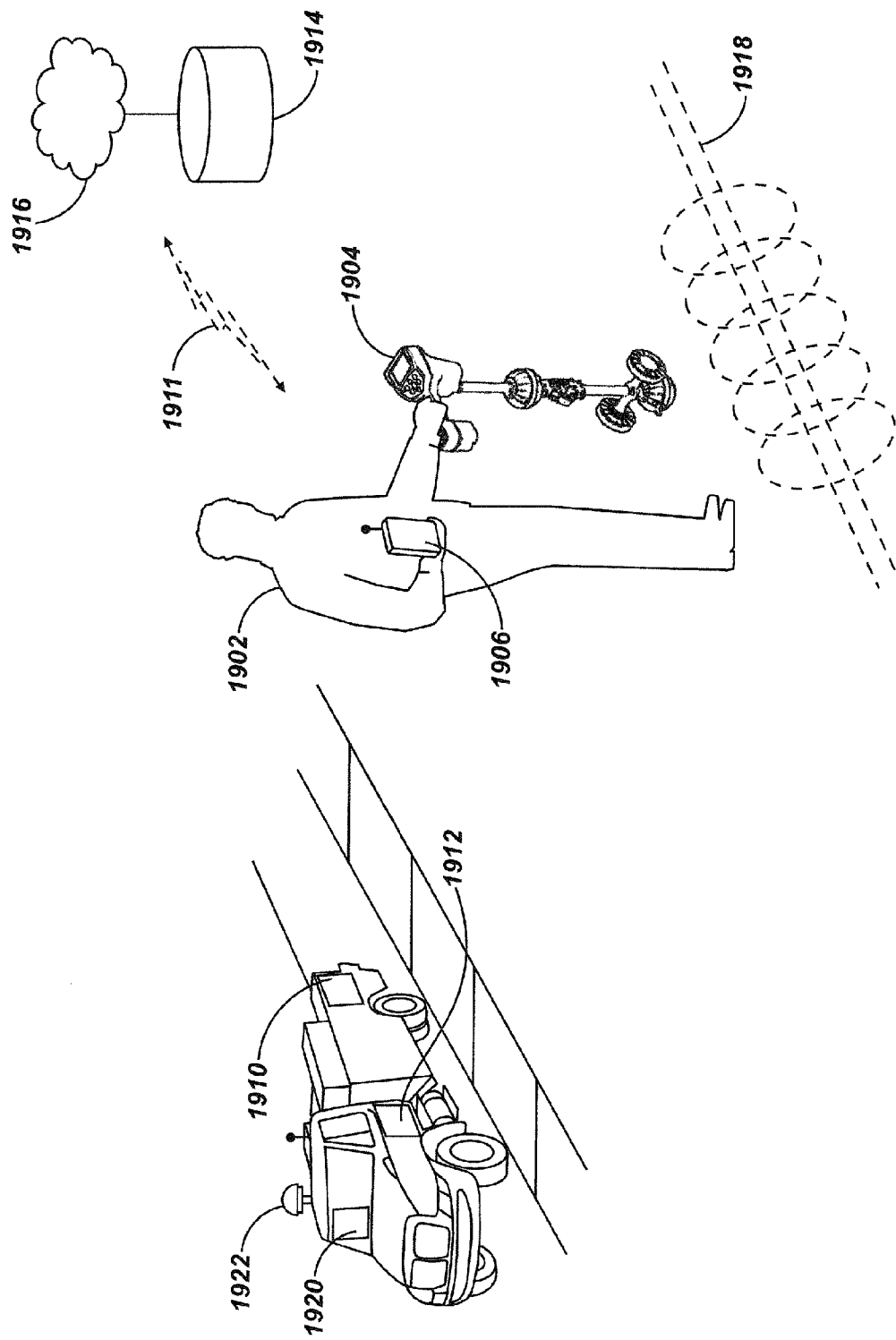
FIG. 19 is a diagrammatic illustration of the use of an alternate embodiment of the present invention.

In one aspect of the present invention the use of historical locate information and images may be used to support return locates at a later date, such as when a previously excavated and filled site is targeted for new excavation for additional work or repair to previous installations. In FIG. 19 a utility locating or construction operator 1902 uses a wireless link equipped locating receiver 1904. The utility locating or construction operator 1902 optionally uses a wireless link equipped hand-held personal communication device 1906 such as an Android phone, Blackberry, iPad, or the like. Real-time GPS data from the wireless link equipped locating receiver 1904 and the personal communication device 1906 may be processed for improved accuracy by using an appropriately equipped utility locator operator's vehicle 1910 which may be equipped with one or more wireless links 1911 as well as with an on-board GPS unit 1912 as a differential GPS stationary reference point. DGPS data may be wirelessly transmitted to the wireless link equipped locating receiver 1904 in real time or stored at the utility locator operator's vehicle 1910 for later post-processing. The GPS receiver in the utility locator operator's vehicle 1910 continuously tracks GPS location so that on arrival at a site, ephemeris, satellite clock and phase data may be transmitted to the wireless link equipped locating receiver 1904 facilitating rapid GPS lock via assisted GPS (A-GPS) or RTK (Real Time Kinetic) GPS. Historical locate images and overlays transmitted from a remote server 1914 over one of the wireless links 1911 may include additional imagery or information from other cloud servers 1916. The processing of orientation, position, and locator derived buried utility positions with refined GPS data provides an opportunity to verify or correct as built drawings and maps or past locate data defining the position of a buried utility such as a pipeline 1918. A series of locates done on the same region could be stored and averaged as a means of improving the accuracy of the recorded locations over time.

In another aspect of the present invention, the utility locator operator's vehicle 1910 may be equipped with a vehicle computer/data relay 1920 acting as a data relay device enabling it to serve as a Wi-Fi or 3G/4G data relay station. By using the full bandwidth of an ISM wireless connection between the wireless link equipped locator receiver 1904, the personal communication device 1906, and the vehicle computer/data relay 1920, a more efficient communication scheme is realized in which the vehicle computer/relay 1920, using an adapter from ISM to USB (not shown), may process the data for communication to the remote server 1914. In doing so the vehicle computer/relay 1920 may merge any additional data from on-board sensors or other deployed devices such as beacons, transmitter, or other DGPS nodes, for example. In another aspect of the present invention, such a vehicle may additionally be equipped with a high powered long range dipole transmitting beacon 1922 enabling the wireless link equipped locating receiver 1904 to continuously calculate its location relative to the vehicle 1910 by measurement of the high powered long range dipole transmitting beacon's 1922 transmissions. The utility locator operator's vehicle 1910 may be also equipped a multi-imager array to collect additional image data of the locate process and area as well as when approaching and leaving the work site.

In another aspect of the present invention the accumulation of various known locate points recorded and used for reference may also serve as a ground grid of known reference points for later mapping processes. Survey markers, bar coded marker stakes and buried or attached RFID tags may be used to code and identify any such known locate points that may be relocated on subsequent visits to the same location. Bar codes in the field may be recognized and recorded using imaging devices associated with either the wireless link equipped locating receiver 1904 or the personal communication device 1906.

The use of the present invention may be extended as a quality-control process to verify or improve records such as as-built utility drawings and maps or any other historical utility records maintained by utility companies or administrations. The association of contemporaneous high resolution imagery of local surface features with relative positions of buried utilities, using processes such as are described herein, enables responsible authorities to continuously improve their records of utility locations.

The use of on-board cameras combined with location and orientation data from on-board sensors may also be used in managing the workflow of proposed excavations. Such a workflow may be tracked by an application running on a personal communication device such as 1906 in FIG. 19. The wireless link equipped locating receiver 1904 shown, is not required for this workflow.

The work flow process may include a step of standing in one fixed location and shooting a series of images while rotating in steps either clockwise or counterclockwise. The size of the rotation step will be such to ensure a predetermined degree of overlap between adjacent images. The compass in the personal communication device is used to provide the operator with guidance with respect to the degree of rotation between adjacent images. The tilt sensor in the personal communication device 1906 is used to guide the utility locating or construction operator 1902 to tilt the camera to a predetermined tilt angle. The utility locating or construction operator 1902 may be instructed to complete more than one rotation and the tilt angle of the images may be varied on subsequent rotations. A ball-in-target (similar in appearance to a circular bubble level) interface may be employed to show the utility locating or construction operator 1902 in which direction to point the camera for each image and an artificial horizon might be employed to instruct the operator to hold the camera at a predetermined tilt angle for each image. Each image may be taken manually or preferable automatically as soon as the camera is pointed in the predetermined direction and orientation for the required image for that step in the predetermined work flow process. The utility locating or construction operator 1902 may be instructed to repeat the above described or a similar workflow process in one or more locations within or adjacent to the proposed excavation site for example, move to the north corner, then west corner, then south etc. This process might be GPS guided by the running phone application on the personal communication device 1906. This work flow process might be employed by a home, business or property owner who planned to engage in digging activity. An application to direct this workflow process and then to upload the images and sensor data to a "call before you dig" call center could be downloaded from a website or other online or cloud based service and run on any supporting personal communication device.

Figure 20:
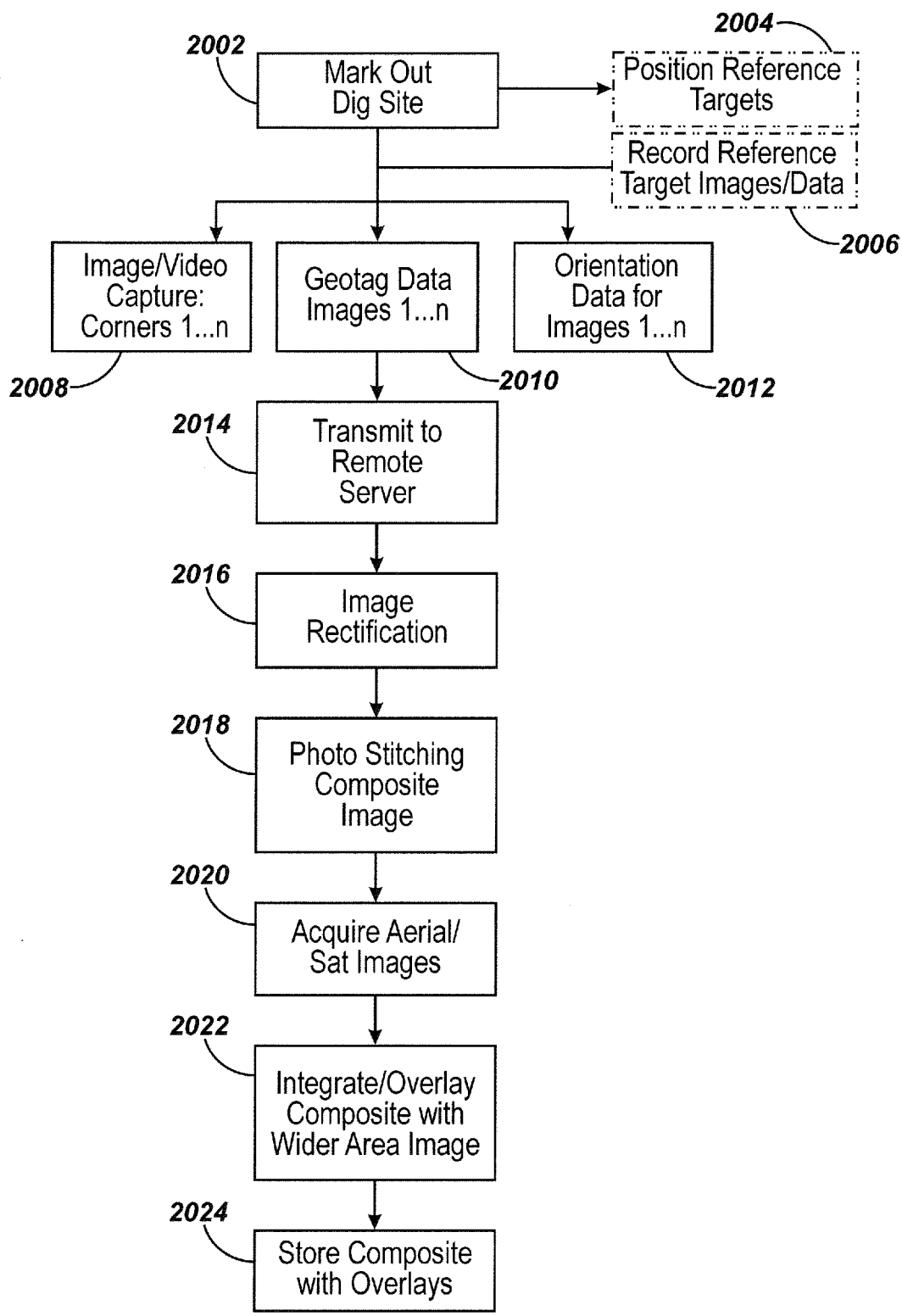
FIG. 20 is a flow chart illustrating an application-managed process of photographing and photo-stitching images of a marked area prior to excavation.

In FIG. 20 a flow chart of such an image based dig-management process is shown. In an initial preparation the intended excavation site is optionally marked out in white paint other high-contrast marking means 2002 (or otherwise indicated or designated). Physical marking of a proposed dig site is not essential. Optionally in another step known reference targets such as meter rods or traffic cones may be temporarily strategically situated 2004 and photographed as part of the site documentation. Images of reference markers may then be captured 2006 in a series of optionally overlapping images from optionally multiple perspectives and the reference marker dimension recorded to assist in later integration. In one scenario, a camera operator simply takes one or more images of the proposed dig site in either a structured or unstructured manner with or without additional sensor data. Given simply an address location and optionally a time of day images may be automatically or manually aligned and placed within existing satellite or aerial images to place the proposed dig site into a geo-referenced or larger scale image based context. In a defined workflow process, images are captured in a predefined manner from each corner of the excavation area. The number of corners used is determined by the shape of proposed excavation area; when a smart-device application is used, the number is input into the application, or the smart device may be used to capture the corners' location using its on-board GPS and sensors 2008. The captured images may be automatically geo-tagged 2010. Sensor data for each image, geo-tagged data for each image if available, and the images themselves and any orientation data 2012 for them are then transmitted via network communication to a remote server 2014. Image rectification 2016 and photo-stitching 2018 processes are performed as described in FIG. 15. Aerial or satellite imagery 2020 is acquired for the region of interest. The composite formed by the photo-stitching 2018 process is then mapped and layered with the satellite or aerial image 2022 using the integrative process described in FIG. 16. In a final step, the processed composite image and sensor data and any associated overlays are stored in a database 2024.

Figure 21:
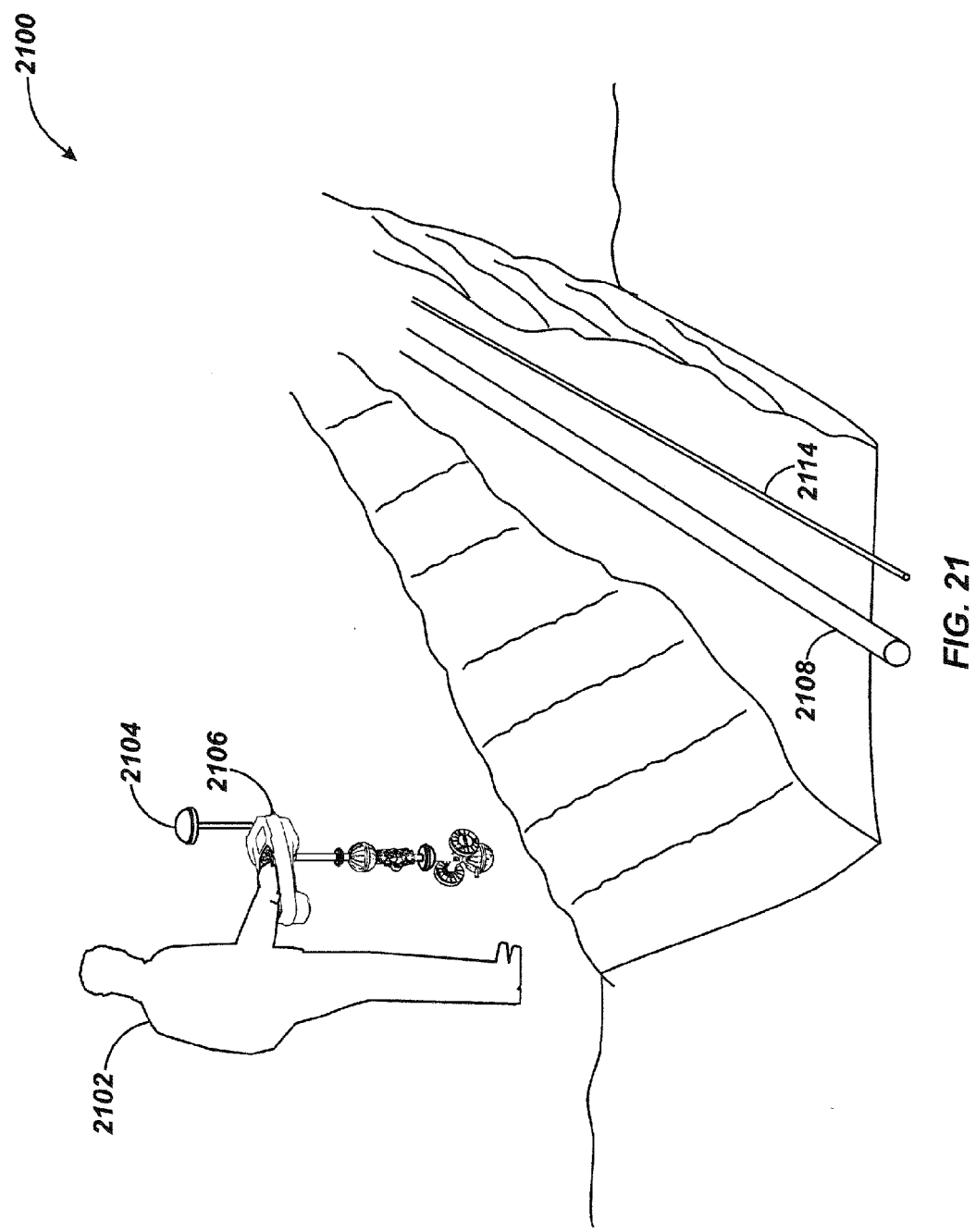
FIG. 21 is a diagrammatic illustration of the use of an embodiment of the present invention in capturing details of new infrastructure installations.

In another aspect of the present invention, new and existing infrastructure may be recorded at installation using the methods described herein, prior to being backfilled or otherwise covered, assuring a higher degree of accuracy and safety in later work requiring the exposure of such utilities. In FIG. 21 a use case 2100 is shown wherein a locator operator 2102 uses a sensor enabled locator similar to the sensor enabled locator 500 shown in FIG. 5 with an attached GPS antenna pod 2104 mounted onto a GPS and imager and sensor enabled locator 2106 with an on-board camera and built-in sensors as described in FIG. 5. Images of a newly installed water line 2108 and power line 2114 are combined with electromagnetic location data from the locator and positional and orientation data from on-board sensors including the GPS unit and are processed on board or at a remote processor for storage in a database. The data may be recovered for later re-excavation of these utilities for repair or replacement in a manner similar to that described in FIG. 19.

The processing of images from on-board cameras presents a unique problem when the field of view of the camera extends above the horizon. The trapezoidal image areas shown in previous Figures, such as trapezoidal image area 114 in FIG. 1 for example, have been simplified for the purpose of exposition. The upper rays of the camera in many instances would extend upward above the horizon. In order to stitch such images the area of the image above a certain angle become problematic because of low resolution and inclusions of image points at essentially infinite distance, and features at far range that interfere with stitching as described in earlier Figures.

Figure 22:
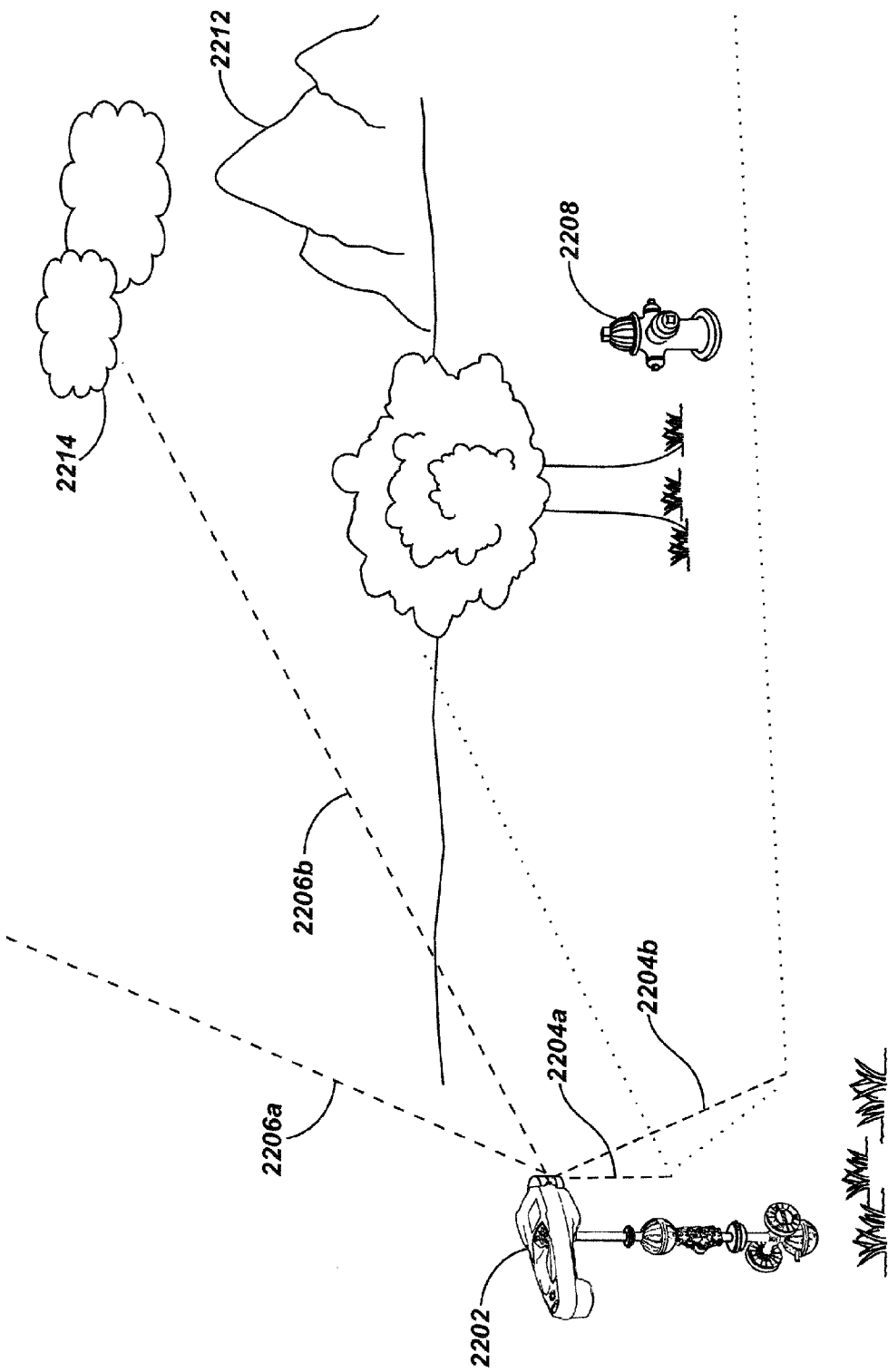
FIG. 22 is a diagrammatic illustration of a locator camera with a field of view extending over the horizon.

In FIG. 22 a locator receiver 2202, for example, is equipped with an exemplary camera whose field of view is indicated by dashed lines, a left lower ray 2204a, a right lower ray 2204b, a left upper ray 2206a and a right upper ray 2206b. The intersection of the camera field of view with the ground surface is indicated in this figure by dotted lines. As can be seen, this field of view includes near features such as a hydrant 2208 and a tree 2210, as well as distant features such as distant hills 2212 and clouds 2214.

In one aspect of the present invention each raw image is divided into sub-images which are processed and used differently depending on image-relative angles of pitch. Given known lens geometry, and a measured angle of pitch in the camera orientation provided by on-board sensors, or a Kalman-filtered navigation package, the individual horizontal scan lines of the original image can be identified by their general degree of pitch relative to the direction of gravity. These image-relative angles of pitch can be used to subdivide into two or more sub-images. Above some inclination, for example n degrees, information becomes less useful for the purpose of constructing a photo-stitched or composite mosaic image of the ground with locate information included. Therefore, for example, the image might be divided into a downward sub-image comprising all pixels that correspond to angles of pitch below n degrees, and a forward sub-image comprising all pixels corresponding to angles of pitch above n degrees. Depending on the region of inclusion selected these images may include some overlap. The downward sub-image will then be rectified as described in FIG. 14 with respect to the horizontal plane and used in the image-stitching process as earlier described. The forward sub-image may be rectified with respect to the vertical plane and used to create a cylindrical panorama for the location at which the images were taken. Neighboring forward images are subjected to a drizzling process to improve the resolution of distant objects around the horizon.

In an alternative approach, portions of the image below 45 degrees may be selected as a sub-image most useful for constructing a mosaic of the ground, while portions above a selected angle such as 75 degrees may be used for constructing a panoramic cylindrical view; portions of the original image between 45 degrees and 75 degrees, for example, may be post-processed for more detailed analysis such as would be used in generating a three-dimensional reconstruction of the locating environment or creating a virtual reality construct.

Figure 23:
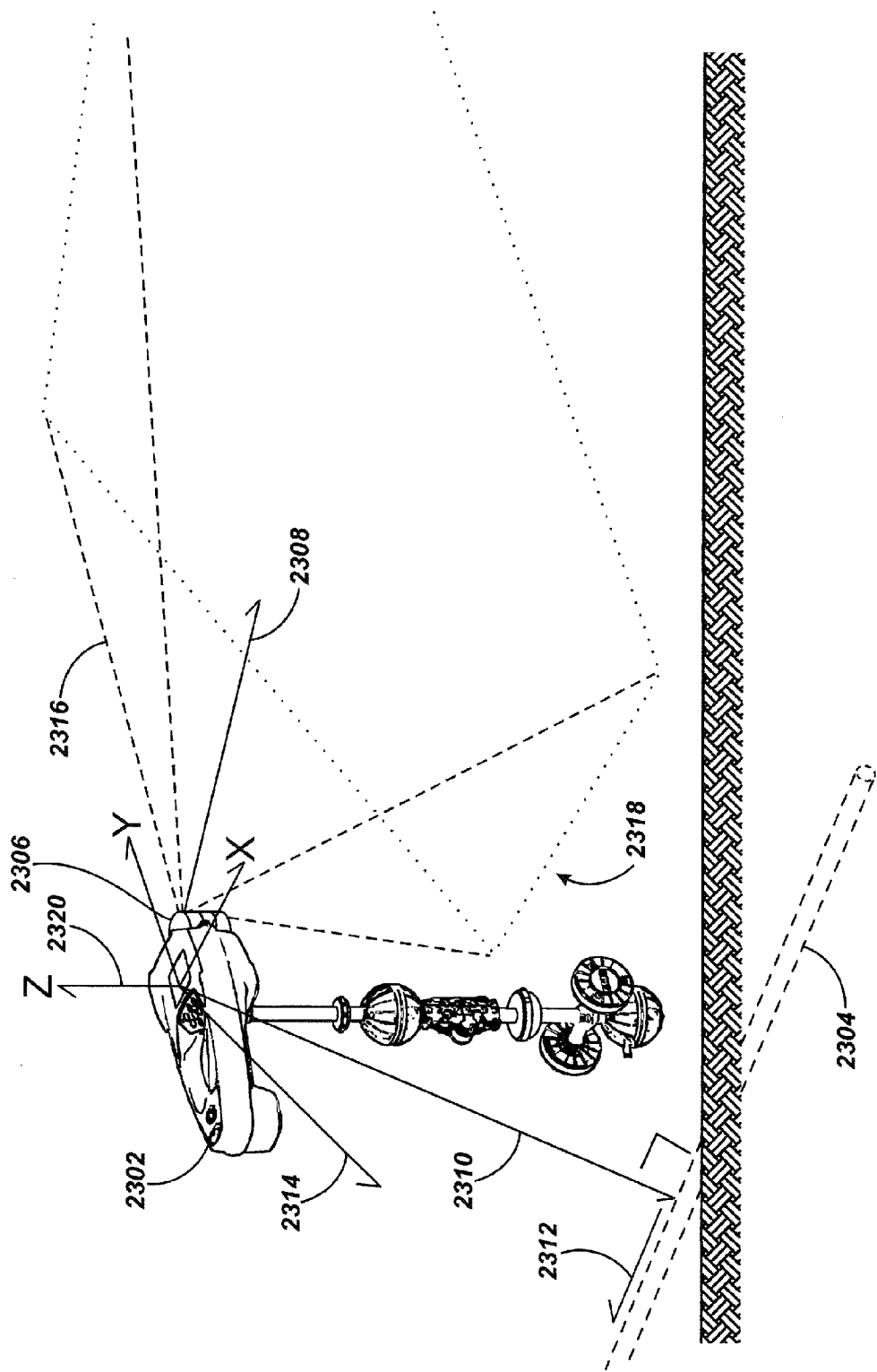
FIG. 23 is a diagrammatic illustration of vectors of interest at the point of image capture during a locate process.

As will be clear from the foregoing disclosures, the emphasis of the present invention is in the creation and use of a database of associated images, buried utility locations, raw buried utility AC magnetic field received data, and other key data items which may include representations of the local static magnetic vector, an acceleration vector, a rotational vector, a velocity vector, DGPS location data, Glonass/Galileo/GPS or WAAS data, RTK positional or phase data or the like. In FIG. 23, an imager equipped locating device 2302 is shown at the moment at which an image is captured while locating an underground pipe 2304. In addition to capturing and storing the image from an on-board camera 2306, for example, the imager equipped locating device 2302 would populate the data record locally or remotely, as discussed previously. Data items so recorded may include, among others, a center field of view vector 2308 representing the center of the field of view of the on-board camera 2306; a pipe position vector 2310 representing the underground pipe's 2304 relative position as detected at that moment; a pipe orientation vector 2312 representing the orientation of the underground pipe 2304; and an earth magnetic field vector 2314 representing the static magnetic field around the locator, including the local magnetic dip angle, attributable to the earth's magnetic field in combination with local influences such as may be caused by nearby iron or steel objects, such as manhole covers, valve stems, and corner marks. Other data such as flammable or tracer gas concentrations, ambient light levels, humidity, radiation levels, barometric pressure, marker paint or flag positions and specific color signatures and soil moisture content, may be measured and recorded in the database for the same moment. In combination with the image processing described previously, the data thus recorded may be used in constructing a ground mosaic or a three-dimensional representation of the location on, above and below the surface of the ground. In FIG. 23, an upper left field of view vector 2316, a projected lower edge 2318 of the image and an XYZ coordinate system 2320 of the imager equipped locating device 2302, and are indicated.

Clearly, other embodiments and modifications of this invention may occur readily to those of ordinary skill in the art in view of these teachings. Therefore, the protection afforded this invention is to be limited only by the following claims, which include all such embodiments and modifications when viewed in conjunction with the above specification and accompanying drawing.

We claim:

1. A locating system, comprising:
   at least one electromagnetic sensing antenna;
   a display;
   a processor;
   a data storage device operatively connected to the processor;
   programming at least partially stored in the data storage device for enabling the processor to determine the location of a buried utility based on signals generated by the sensing antenna and to generate buried utility positional data that can be viewed on the display;
   an image sensor operatively connected to the processor for generating signals representing images captured by the image sensor during a locating process to substantially include an area being mapped; and a second processor remote from the processor, a communications link for transmitting the buried utility positional data to the second processor and programming for enabling the second processor to combine at least one of the images captured by the image sensor with the buried utility positional data to form at least one composite image of the area being mapped, wherein the composite image has a perspective selected from the group consisting of a bird's eye view and an aerial view.

2. The locating system of claim 1 and further comprising an orientation sensor operatively connected to the processor.

3. The locating system of claim 2 wherein the orientation sensor comprises an accelerometer.

4. The locating system of claim 1 wherein the programming enables at least two images captured by the imaging sensor to be co-processed into alignment with one another to form a geospatial mosaic image.

5. The locating system of claim 1 wherein the programming further enables information describing buried utilities including locator-sensed locations, depths and orientations to be stored with positional correspondence information relating the information to images that are captured by the imaging sensor.

6. The locating system of claim 1 wherein the programming further enables buried utility positions, orientations and depths to be displayed in composite with, or overlaid onto the images captured by the imaging sensor such that the relative positions of a plurality of buried utilities may be viewed in relation to objects visible in the images captured by the imaging sensor.

7. The locating system of claim 1 wherein the programming further enables composite images and associated utility positional information to be placed into, and aligned to fit in a positionally indexed manner with satellite or aerial images.

8. The locating system of claim 1 wherein the system further comprises means for allowing the processor to acquire the satellite or aerial images from an on-line source.

9. The locating system of claim 1 further comprising at least one portable sonde capable of transmitting a locator-detectable magnetic field frequency for receipt by the electromagnetic sensing antenna.

10. The locating system of claim 1 wherein the programming further enables the second processor to combine geo-referenced images and detected locator information and the system further includes a communication link for transferring the geo-referenced images and detected locator information to a hand-held display device and displaying the images and detected locator information to an operator based on a real time position of the hand-held device.

11. The locating system of claim 1 further comprising a marking paint applicator.

12. The locating system of claim 1 further comprising a locator body and a GPS receiver disposed on or within the locator body and coupled to the processor.

13. The locating system of claim 1 wherein the image sensor generates a plurality of images and the plurality of images are stitched to generate a composite image representing an area being mapped.

14. The locating system of claim 13 wherein the buried utility positional data is associated with the composite image so as to identify the position of the buried utility on the composite image.

15. The locating system of claim 1 wherein the at least one electromagnetic sensing antenna includes an omnidirectional antenna array.

16. The locating system of claim 1 wherein multiple images captured by the image sensor are integrated with existing site images provided from other sources, with the images from the image sensor and the existing site images correlated into a composite portrayal of site measurement and relative orientation.

17. The locating system of claim 16 wherein one or more of the images captured by the image sensor are captured in a non-vertical, no-bird's eye view and are then projected into a bird's eye view orientation.

18. The locating system of claim 16 wherein two or more of the images captured by the image sensor are aligned to form a mosaic image.

19. The locating system of claim 16 wherein the buried utility position and depth are displayed in composite with the one or more images captured by the image sensor.

20. The locating system of claim 19 wherein the display includes a subterranean profile of the buried utility.

21. The locating system of claim 16 wherein the image sensor comprises a plurality of image sensors covering at least partially overlapping areas.

22. The locating system of claim 21 wherein the plurality of image sensors include a left camera, a center camera, and a right camera.

23. The locating system of claim 21 wherein the image sensor comprises a stereoscopic image sensor and the processor is further configured to generate a three-dimensional environmental model of the locating site based in part on stereoscopic images provided from the stereoscopic image sensor.

24. The locating system of claim 16 wherein the images captured by the image sensor and the buried utility positional data are placed into and aligned to fit in a positionally indexed manner with a satellite or aerial image of a locating activity area.

25. A locating system, comprising:
at least one electromagnetic sensing antenna;
a display;
a processor;
a data storage device operatively connected to the processor;
programming at least partially stored in the data storage device for enabling the processor to determine the location of a buried utility based on signals generated by the sensing antenna and to generate buried utility positional data that can be viewed on the display; and
an image sensor operatively connected to the processor for generating signals representing images captured by the image sensor during a locating process to substantially include an area being mapped;
wherein the at least one electromagnetic sensing antenna includes an omnidirectional antenna array, a left gradient antenna coil, and a right gradient antenna coil for sensing the fields generated along a buried utility.

26. A locating system, comprising:
a locator comprising:
a locator body;
an orientation sensor disposed on or within the locator body;
an upper and a lower omnidirectional antenna array disposed on or in or coupled to the locator body;
an image sensor disposed on or in the locator body;
a display disposed on or in the locator body;
a processor disposed on or within the locator body; and a memory operatively coupled to the processor;
wherein the processor is configured to:
determine depth and positional information associated with a hidden or buried utility in a locate area;
determine location information associated with a location of the locator based at least in part on information provided from the orientation sensor;
receive a plurality of images from the image sensor of the locate area;
associate ones of the images with simultaneously determined depth and positional information; and
store the associated images and depth and positional information in the memory for subsequent post-processing.

27. The locating system of claim 26 wherein the orientation sensor comprises two or more of an accelerometer, a compass sensor, a gyroscopic sensor, a GPS receiver, an acoustic sensor, and a laser range-finding device.

28. The locating system of claim 27 further comprising providing, on the display, a visual representation of the images and the depth and positional information of the hidden or buried utility.

29. The locating system of claim 26 wherein the associated images and depth and positional information are further correlated with an aerial or satellite image including the locate area, and storing the associated images, depth and position information, and correlated aerial or satellite image in the memory.

30. The locating system of claim 29 further comprising providing, on the display, a visual representation of the aerial or satellite image, images, and the depth and positional information of the hidden or buried utility.

\* \* \* \* \*